US010116549B2

(12) United States Patent
Altin et al.

(10) Patent No.: US 10,116,549 B2
(45) Date of Patent: Oct. 30, 2018

(54) APPARATUS AND METHOD FOR MODIFYING PACKET INTERVAL TIMING BASED ON DEVICE CHARACTERISTICS

(71) Applicant: AFERO, INC., Los Altos, CA (US)

(72) Inventors: Daniel Altin, San Francisco, CA (US); Steve Kroll, San Francisco, CA (US)

(73) Assignee: Afero, Inc., Los Gatos, CA (US)

( * ) Notice: Subject to any disclaimer, the term of this patent is extended or adjusted under 35 U.S.C. 154(b) by 273 days.

(21) Appl. No.: 15/081,701

(22) Filed: Mar. 25, 2016

(65) Prior Publication Data
US 2017/0280395 A1 Sep. 28, 2017

(51) Int. Cl.
| H04L 12/759 | (2013.01) |
| H04L 5/00 | (2006.01) |
| H04W 52/02 | (2009.01) |
| H04W 8/00 | (2009.01) |
| H04W 24/08 | (2009.01) |
| H04W 4/70 | (2018.01) |
| H04W 28/24 | (2009.01) |
| H04W 28/18 | (2009.01) |

(52) U.S. Cl.
CPC .......... *H04L 45/028* (2013.01); *H04L 5/0082* (2013.01); *H04W 4/70* (2018.02); *H04W 8/005* (2013.01); *H04W 24/08* (2013.01); *H04W 28/18* (2013.01); *H04W 28/24* (2013.01); *H04W 52/0258* (2013.01)

(58) Field of Classification Search
CPC .... H04L 45/028; H04L 5/0082; H04W 76/10; H04W 76/12; H04W 76/15; H04W 28/18; H04W 28/24; H04W 28/26; H04W 4/70
See application file for complete search history.

(56) References Cited

U.S. PATENT DOCUMENTS

2013/0223217 A1* 8/2013 Turner ............. H04W 28/0273
370/231
2015/0365780 A1* 12/2015 Xie ........................ H04W 4/008
455/41.2
2016/0095047 A1* 3/2016 Lee ......................... H04W 4/80
370/328

* cited by examiner

*Primary Examiner* — Ashley Shivers
(74) *Attorney, Agent, or Firm* — Nicholson De Vos Webster & Elliott LLP

(57) ABSTRACT

An apparatus and method are described for selecting an appropriate advertising interval for an IoT device. For example, one embodiment of an apparatus comprises: Internet of Things (IoT) device data collection circuitry/logic to collect IoT device usage data and/or other IoT device data; advertising interval determination circuitry/logic to determine an appropriate advertising interval based on the IoT device usage data and/or other IoT device data; and advertising interval selection circuitry/logic to implement the appropriate advertising interval determined by the advertising interval determination circuitry/logic.

19 Claims, 35 Drawing Sheets

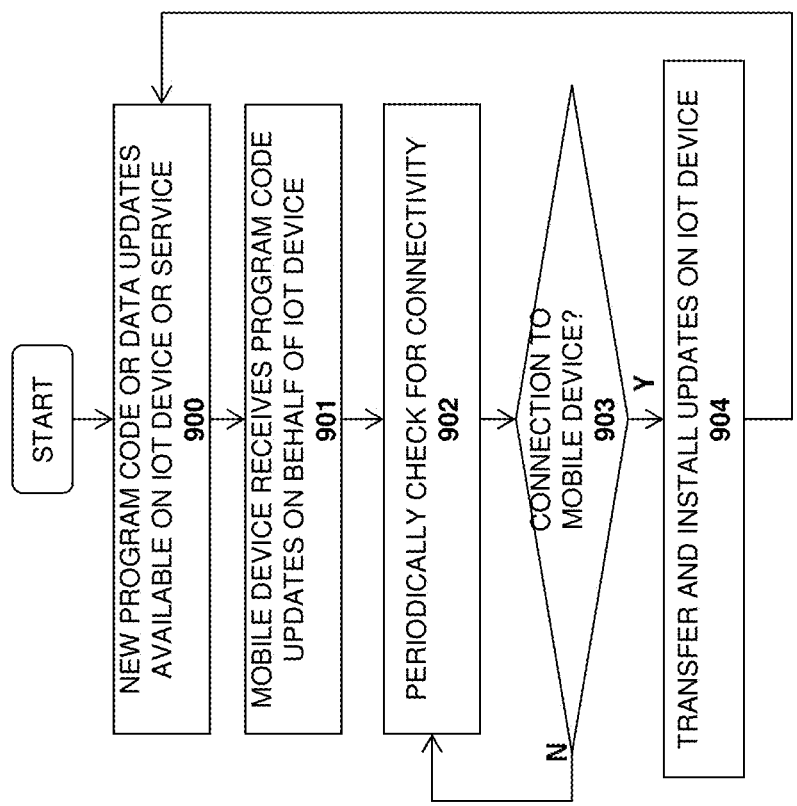

ly-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.
APPARATUS AND METHOD FOR MODIFYING PACKET INTERVAL TIMING BASED ON DEVICE CHARACTERISTICS

BACKGROUND

Field of the Invention

This invention relates generally to the field of computer systems. More particularly, the invention relates to an apparatus and method for modifying packet interval timing (such as advertising interval timing) based on device characteristics.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

For IoT devices which are battery-powered, power consumption becomes a significant issue. Power consumption is particularly problematic for battery powered IoT devices which communicate wirelessly via Bluetooth or WiFi communication channels. For example, using the Bluetooth Low Energy (BTLE) protocol an IoT device "advertises" its existence to all nearby listening devices at some predefined interval. The act of advertising over BTLE uses quite a bit of power, especially relative to the overall power usage of the IoT device, which may be idle for a majority of the time. Consequently, there is a need to reduce the power consumption of IoT devices, particularly with respect to wireless data communication.

BRIEF DESCRIPTION OF THE DRAWINGS

A better understanding of the present invention can be obtained from the following detailed description in conjunction with the following drawings, in which:

FIG. 9B illustrates an embodiment of a method in which program code and data updates are provided to the IoT device;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
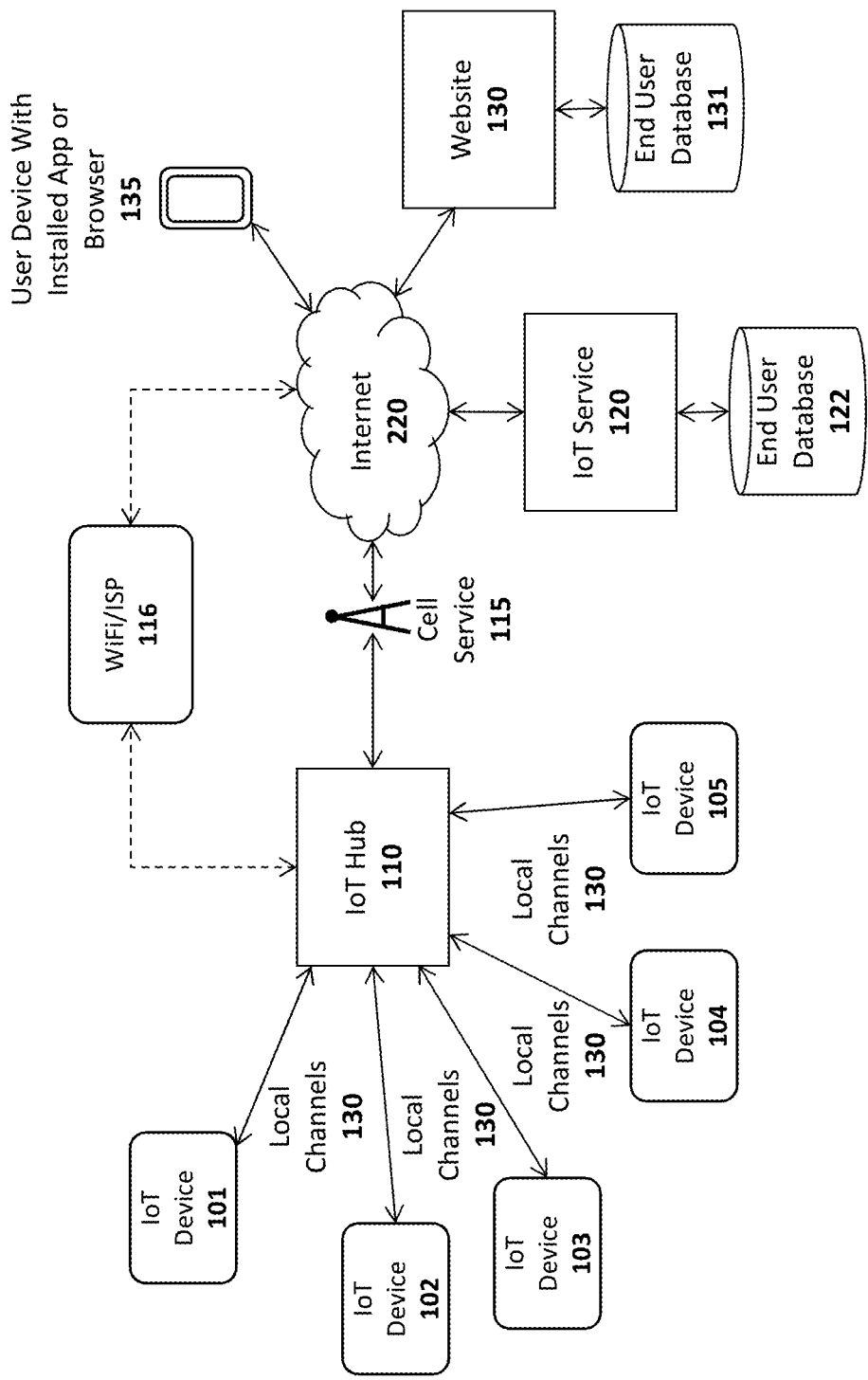
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detector, etc), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120).

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
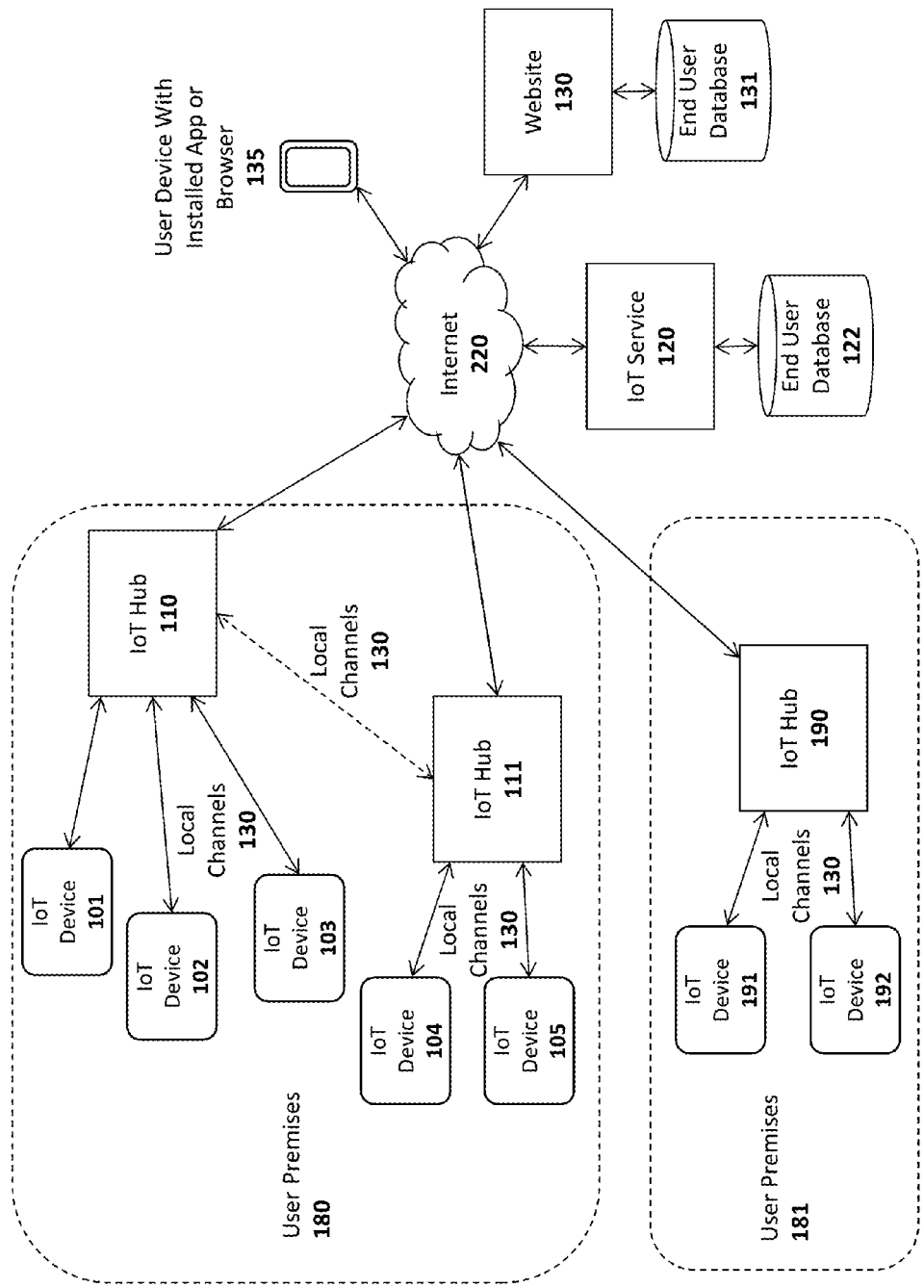

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
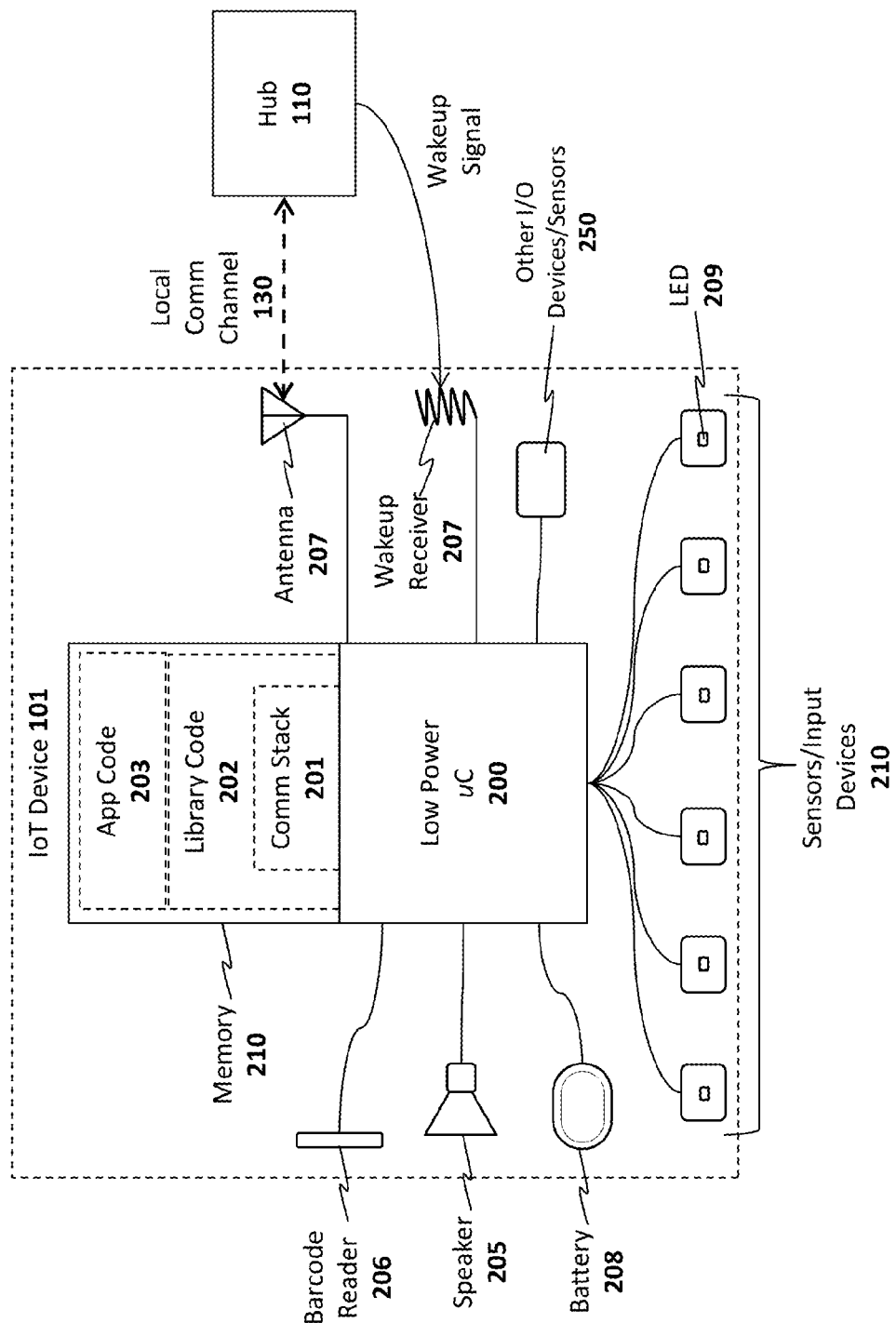
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identify module (SIM).

Figure 3:
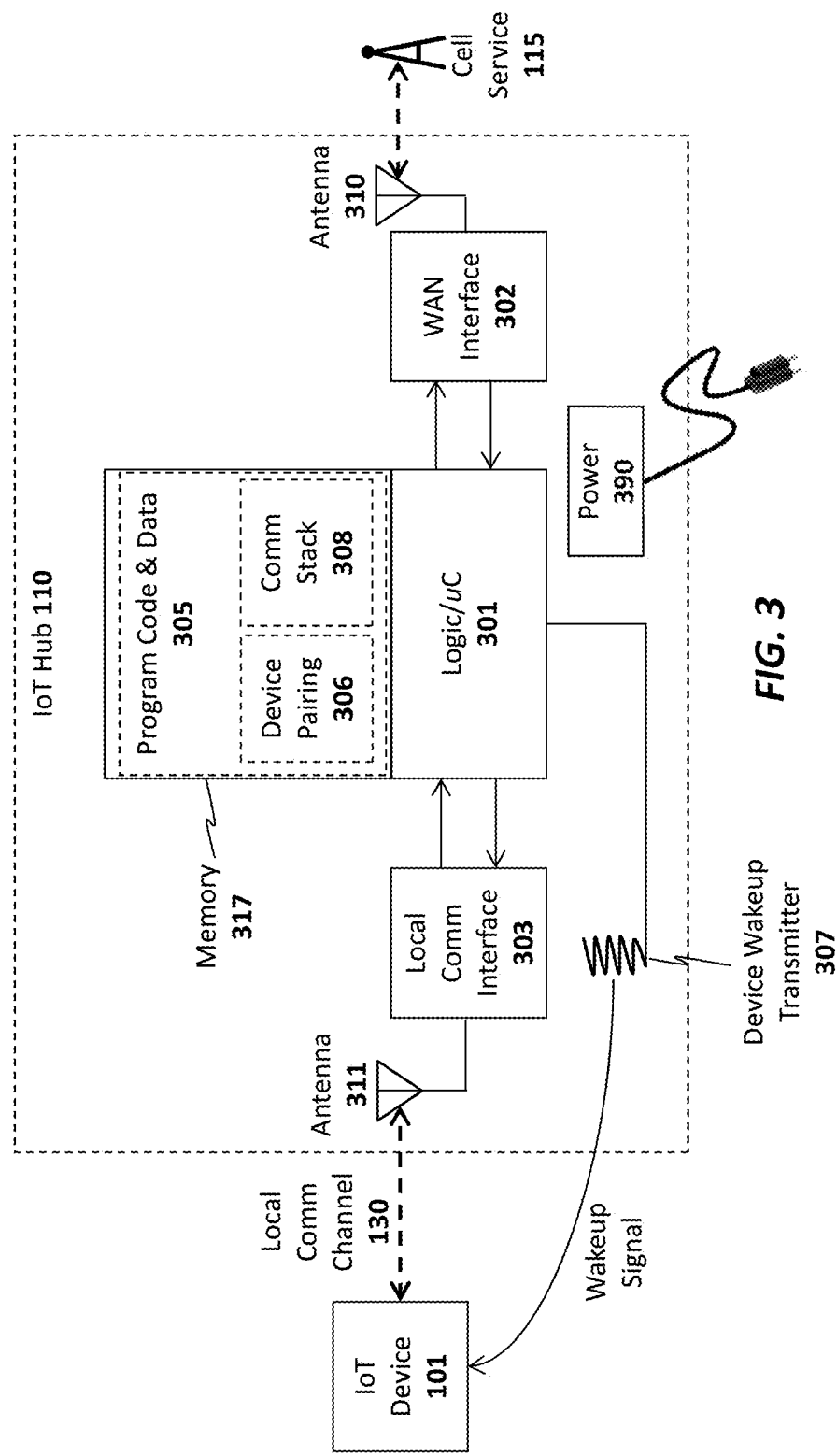
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identify module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID)

or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
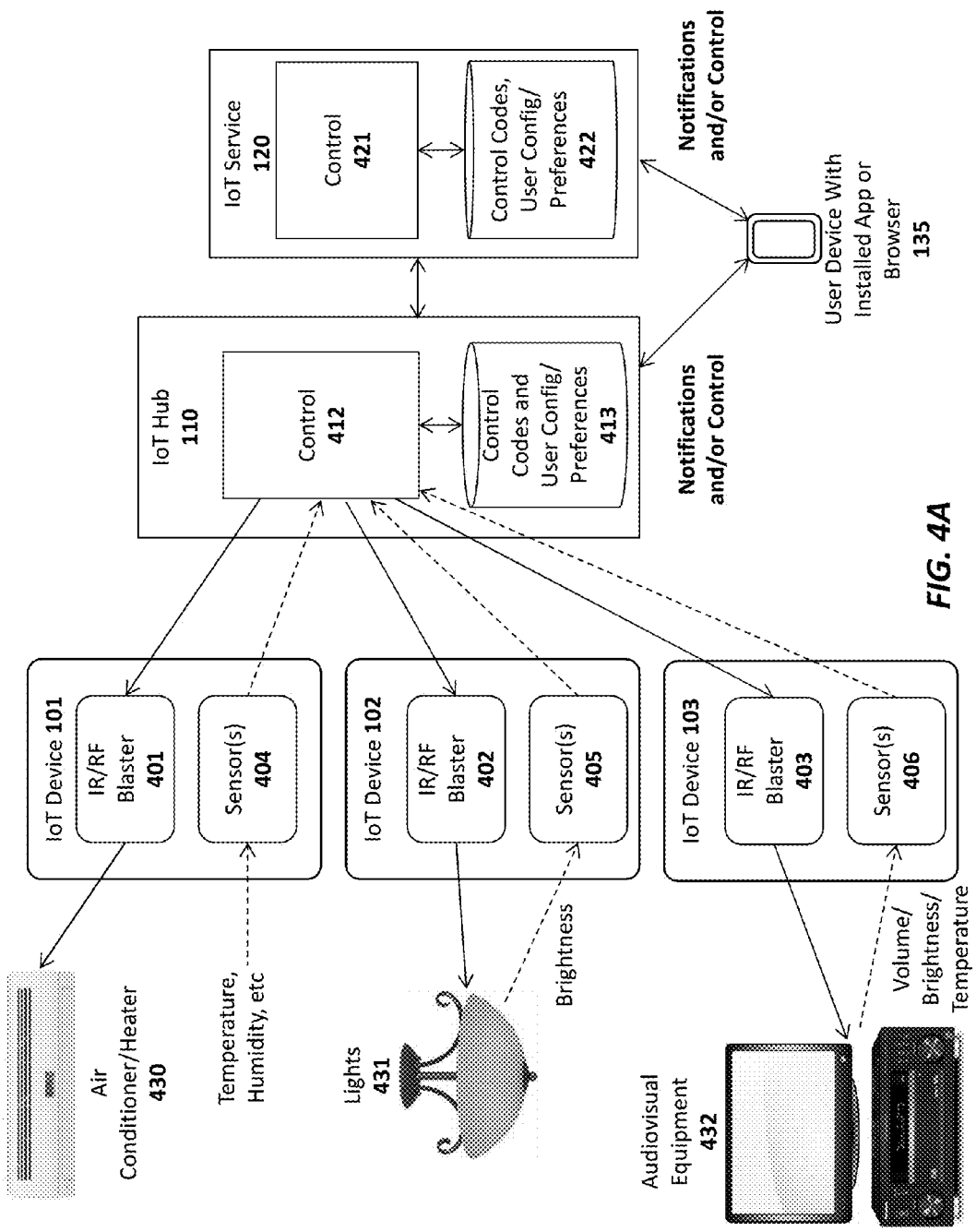
FIG. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, A/V receiver, cable/satellite receiver, AppleTV™, etc). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
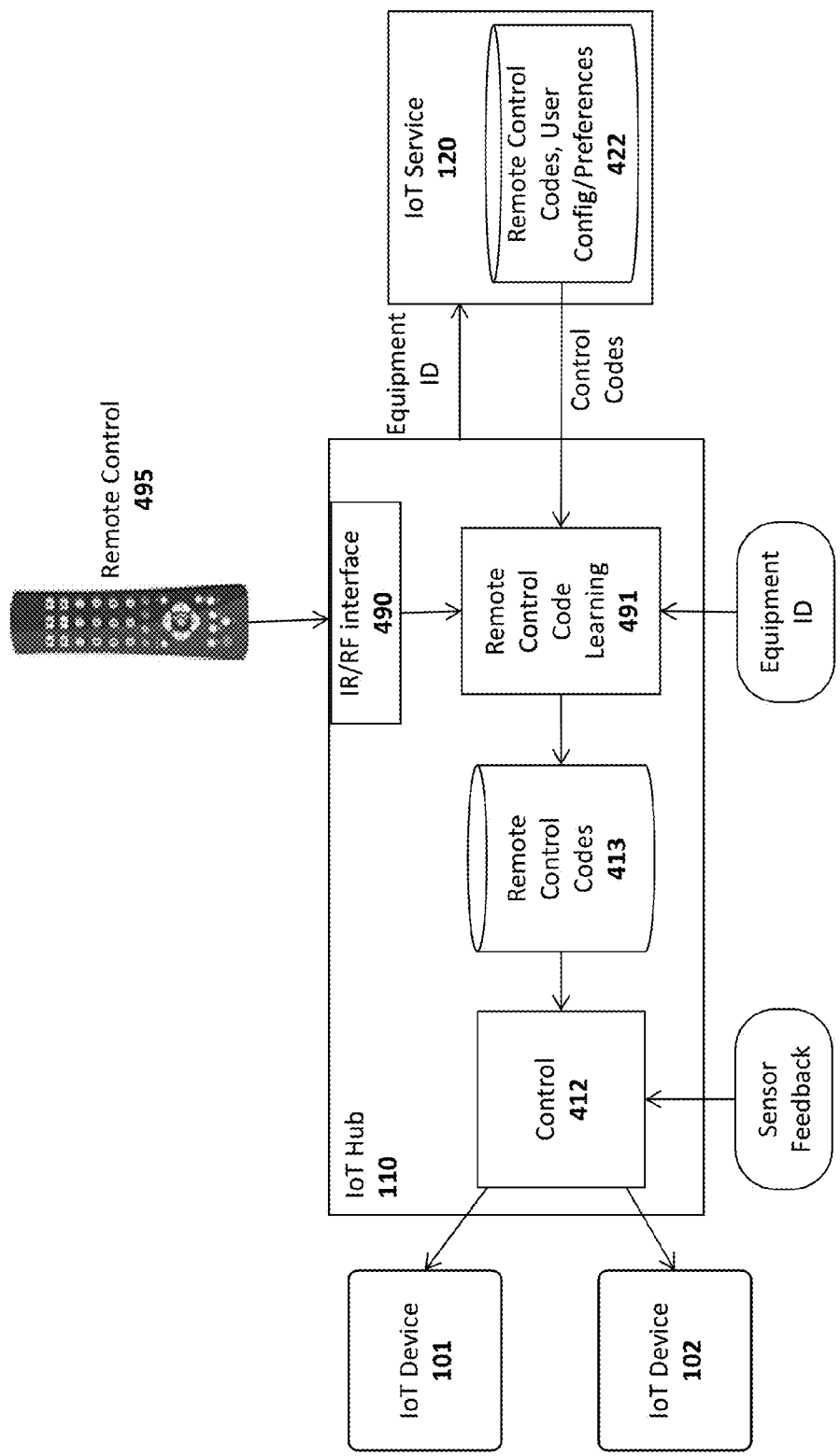

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
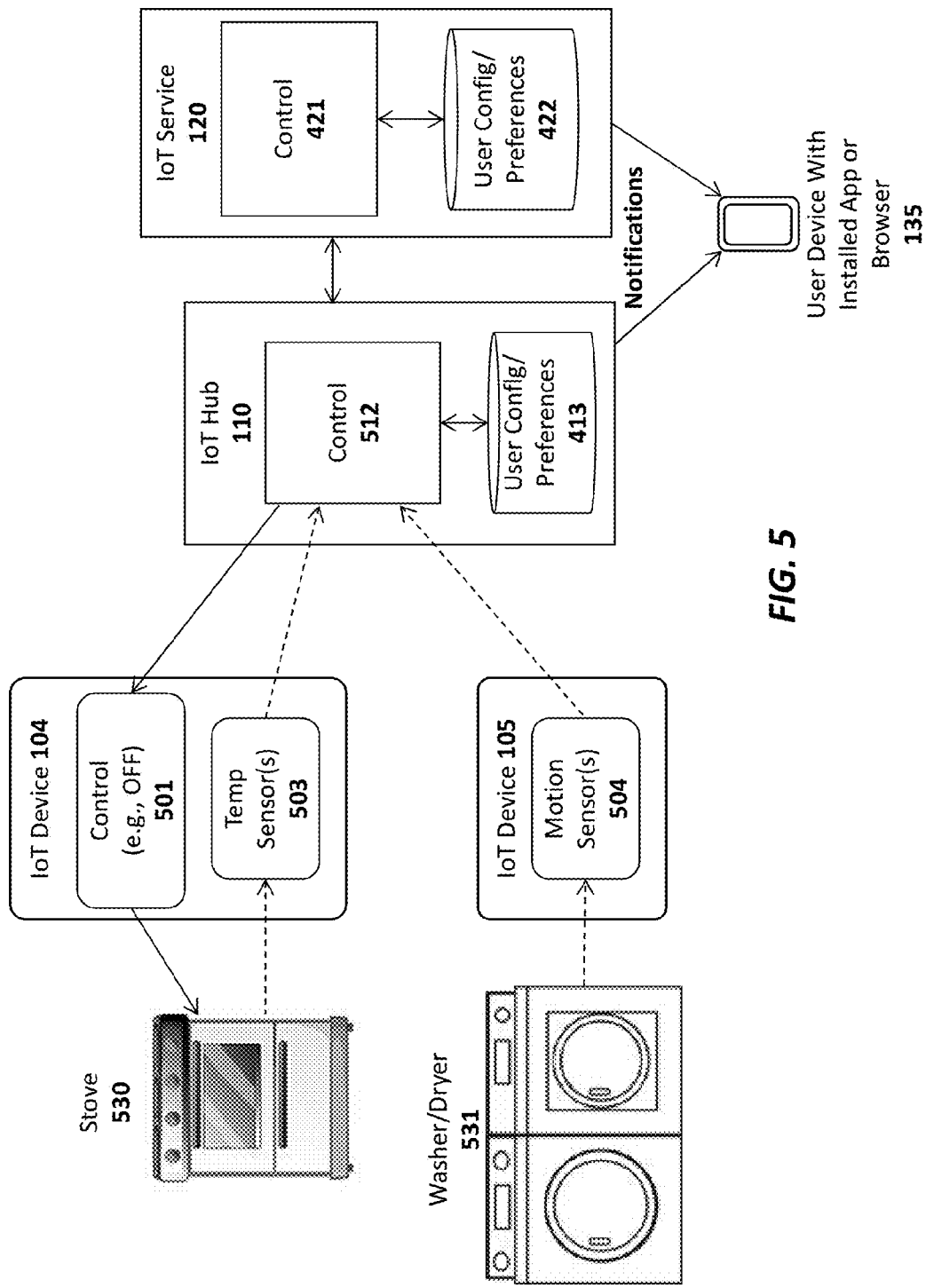
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is detected to be on for more than a threshold time period (e.g., based on the measured temperature), then control logic 512 may transmit a notification to the end user's device 135 informing the user that the stove 530 is on. In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove 530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer. Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification).

Apparatus and Method for Communicating Data Through an Intermediary Device

As mentioned above, because the wireless technologies used to interconnect IoT devices such as Bluetooth LE are generally short range technologies, if the hub for an IoT implementation is outside the range of an IoT device, the IoT device will not be able to transmit data to the IoT hub (and vice versa).

To address this deficiency, one embodiment of the invention provides a mechanism for an IoT device which is outside of the wireless range of the IoT hub to periodically connect with one or more mobile devices when the mobile devices are within range. Once connected, the IoT device can transmit any data which needs to be provided to the IoT hub to the mobile device which then forwards the data to the IoT hub.

Figure 6:
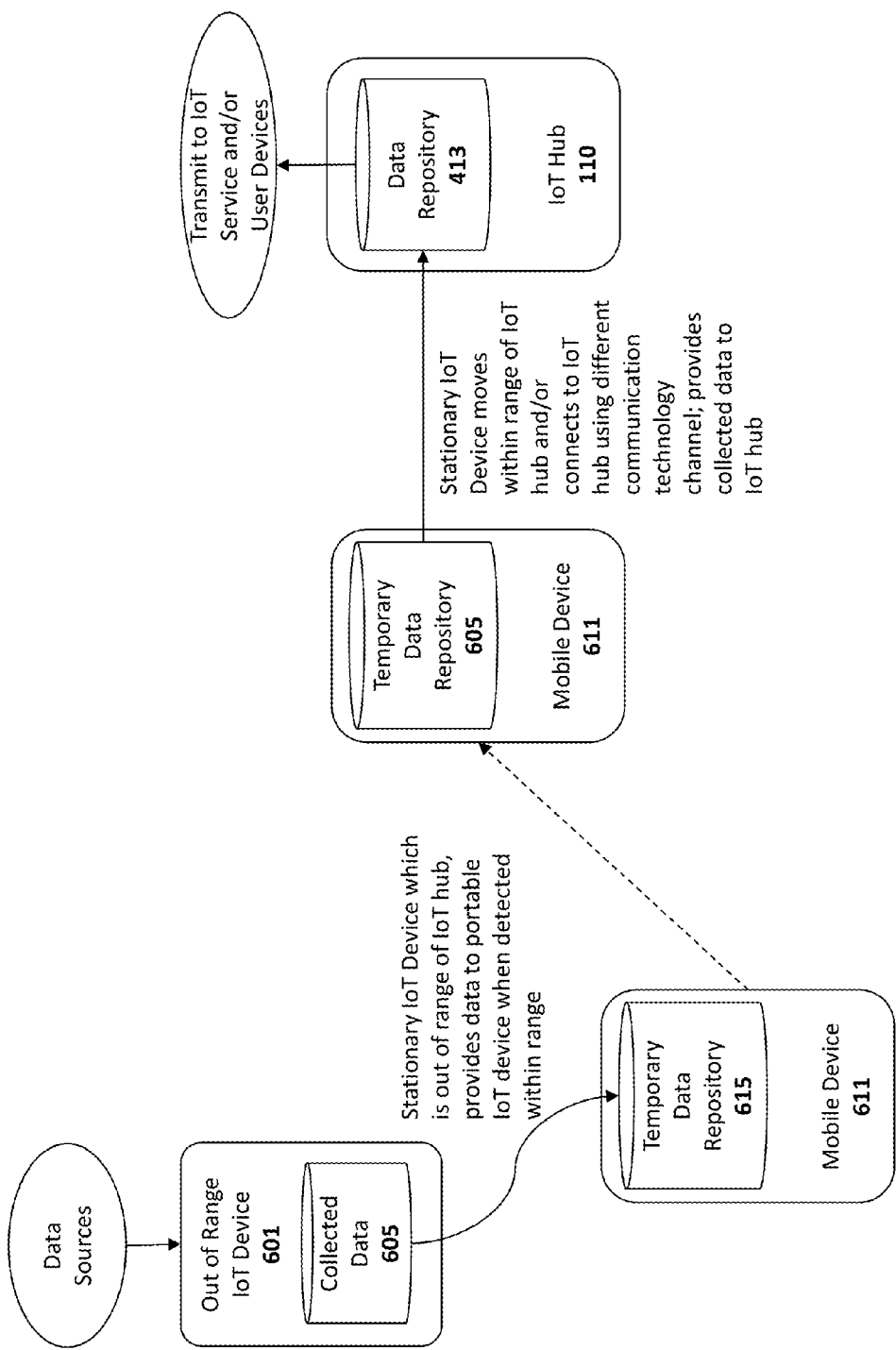
FIG. 6 illustrates one embodiment of a system in which an intermediary mobile device collects data from a stationary IoT device and provides the data to an IoT hub.

As illustrated in FIG. 6 one embodiment includes an IoT hub 110, an IoT device 601 which is out of range of the IoT hub 110 and a mobile device 611. The out of range IoT device 601 may include any form of IoT device capable of collecting and communicating data. For example, the IoT device 601 may comprise a data collection device configured within a refrigerator to monitor the food items available in the refrigerator, the users who consume the food items, and the current temperature. Of course, the underlying principles of the invention are not limited to any particular type of IoT device. The techniques described herein may be implemented using any type of IoT device including those used to collect and transmit data for smart meters, stoves, washers, dryers, lighting systems, HVAC systems, and audiovisual equipment, to name just a few.

Moreover, the mobile device In operation, the IoT device 611 illustrated in FIG. 6 may be any form of mobile device capable of communicating and storing data. For example, in one embodiment, the mobile device 611 is a smartphone with an app installed thereon to facilitate the techniques described herein. In another embodiment, the mobile device 611 comprises a wearable device such as a communication token affixed to a neckless or bracelet, a smartwatch or a fitness device. The wearable token may be particularly useful for elderly users or other users who do not own a smartphone device.

In operation, the out of range IoT device 601 may periodically or continually check for connectivity with a mobile device 611. Upon establishing a connection (e.g., as the result of the user moving within the vicinity of the refrigerator) any collected data 605 on the IoT device 601 is automatically transmitted to a temporary data repository 615 on the mobile device 611. In one embodiment, the IoT device 601 and mobile device 611 establish a local wireless communication channel using a low power wireless standard such as BTLE. In such a case, the mobile device 611 may initially be paired with the IoT device 601 using known pairing techniques.

One the data has been transferred to the temporary data repository, the mobile device 611 will transmit the data once communication is established with the IoT hub 110 (e.g., when the user walks within the range of the IoT hub 110). The IoT hub may then store the data in a central data repository 413 and/or send the data over the Internet to one or more services and/or other user devices. In one embodiment, the mobile device 611 may use a different type of communication channel to provide the data to the IoT hub 110 (potentially a higher power communication channel such as WiFi).

Figure 7:
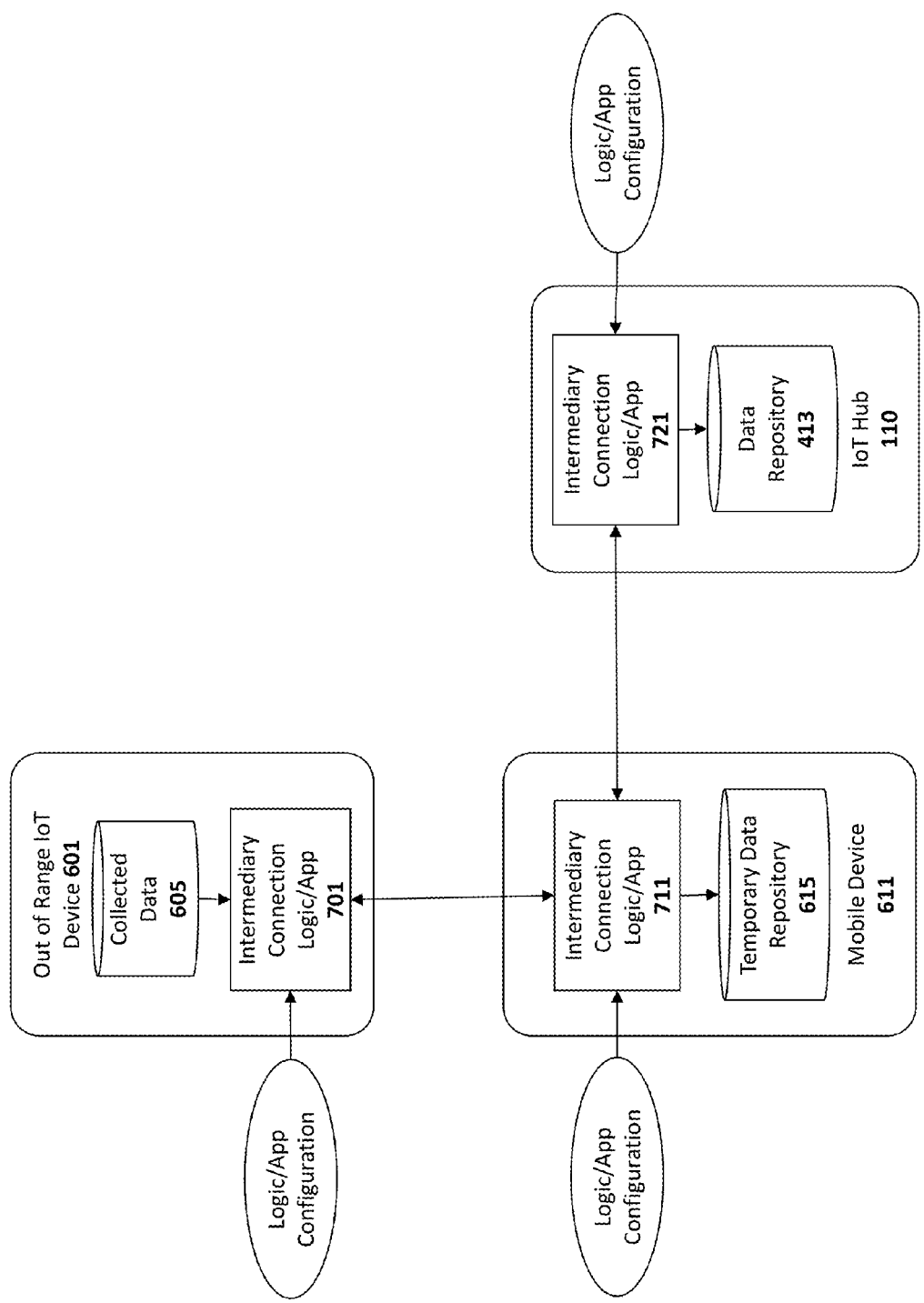
FIG. 7 illustrates intermediary connection logic implemented in one embodiment of the invention.

The out of range IoT device 601, the mobile device 611, and the IoT hub may all be configured with program code and/or logic to implement the techniques described herein. As illustrated in FIG. 7, for example, the IoT device 601 may be configured with intermediary connection logic and/or application, the mobile device 611 may be configured with an intermediary connection logic/application, and the IoT hub 110 may be configured with an intermediary connection logic/application 721 to perform the operations described herein. The intermediary connection logic/application on each device may be implemented in hardware, software, or any combination thereof. In one embodiment, the intermediary connection logic/application 701 of the IoT device 601 searches and establishes a connection with the intermediary connection logic/application 711 on the mobile device (which may be implemented as a device app) to transfer the data to the temporary data repository 615. The intermediary connection logic/application 701 on the mobile device 611 then forwards the data to the intermediary connection logic/application on the IoT hub, which stores the data in the central data repository 413.

As illustrated in FIG. 7, the intermediary connection logic/applications 701, 711, 721, on each device may be configured based on the application at hand. For example, for a refrigerator, the connection logic/application 701 may only need to transmit a few packets on a periodic basis. For other applications (e.g., temperature sensors), the connection logic/application 701 may need to transmit more frequent updates.

Rather than a mobile device 611, in one embodiment, the IoT device 601 may be configured to establish a wireless connection with one or more intermediary IoT devices, which are located within range of the IoT hub 110. In this embodiment, any IoT devices 601 out of range of the IoT hub may be linked to the hub by forming a "chain" using other IoT devices.

In addition, while only a single mobile device 611 is illustrated in FIGS. 6-7 for simplicity, in one embodiment, multiple such mobile devices of different users may be configured to communicate with the IoT device 601. Moreover, the same techniques may be implemented for multiple other IoT devices, thereby forming an intermediary device data collection system across the entire home.

Moreover, in one embodiment, the techniques described herein may be used to collect various different types of pertinent data. For example, in one embodiment, each time the mobile device 611 connects with the IoT device 601, the identity of the user may be included with the collected data 605. In this manner, the IoT system may be used to track the behavior of different users within the home. For example, if used within a refrigerator, the collected data 605 may then include the identify of each user who passes by fridge, each user who opens the fridge, and the specific food items consumed by each user. Different types of data may be collected from other types of IoT devices. Using this data the system is able to determine, for example, which user washes clothes, which user watches TV on a given day, the times at which each user goes to sleep and wakes up, etc. All of this crowd-sourced data may then be compiled within the data repository 413 of the IoT hub and/or forwarded to an external service or user.

Another beneficial application of the techniques described herein is for monitoring elderly users who may need assistance. For this application, the mobile device 611 may be a very small token worn by the elderly user to collect the information in different rooms of the user's home. Each time the user opens the refrigerator, for example, this data will be included with the collected data 605 and transferred to the IoT hub 110 via the token. The IoT hub may then provide the data to one or more external users (e.g., the children or other individuals who care for the elderly user). If data has not been collected for a specified period of time (e.g., 12 hours), then this means that the elderly user has not been moving around the home and/or has not been opening the refrigerator. The IoT hub 110 or an external service connected to the IoT hub may then transmit an alert notification to these other individuals, informing them that they should check on the elderly user. In addition, the collected data 605 may include other pertinent information such as the food being consumed by the user and whether a trip to the grocery store is needed, whether and how frequently the elderly user is watching TV, the frequency with which the elderly user washes clothes, etc.

In another implementation, the if there is a problem with an electronic device such as a washer, refrigerator, HVAC system, etc, the collected data may include an indication of a part that needs to be replaced. In such a case, a notification may be sent to a technician with a request to fix the problem. The technician may then arrive at the home with the needed replacement part.

Figure 8:
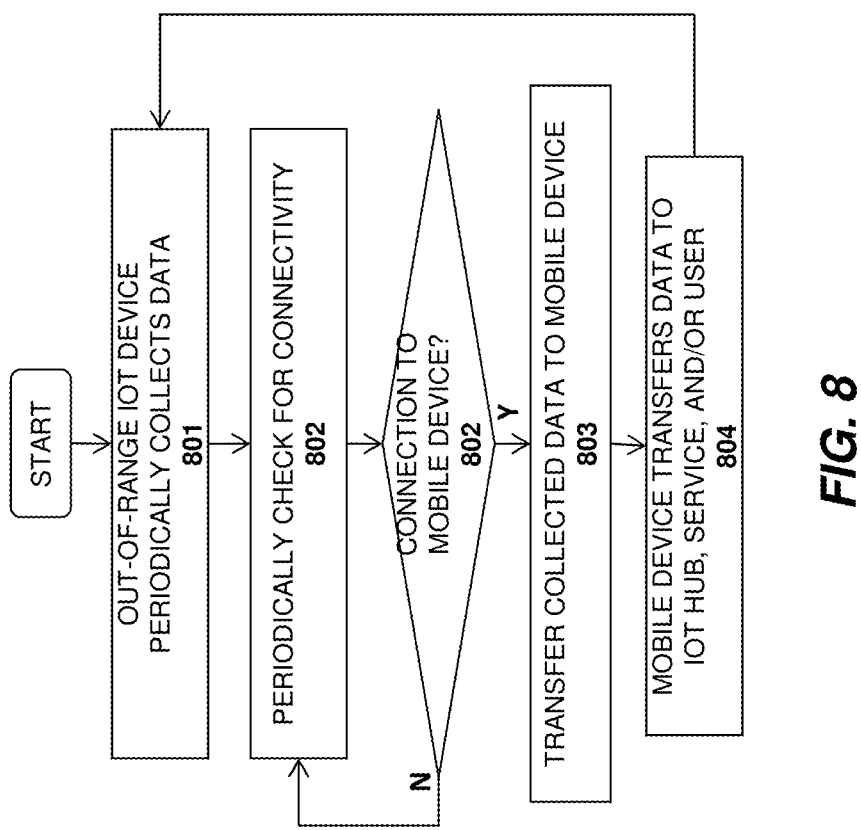
FIG. 8 illustrates a method in accordance with one embodiment of the invention.

A method in accordance with one embodiment of the invention is illustrated in FIG. 8. The method may be implemented within the context of the architectures described above, but is not limited to any particular architecture.

At 801, an IoT device which is out of range of the IoT hub periodically collects data (e.g., opening of the refrigerator door, food items used, etc). At 802 the IoT device periodically or continually checks for connectivity with a mobile device (e.g., using standard local wireless techniques for establishing a connection such as those specified by the BTLE standard). If the connection to the mobile device is established, determined at 802, then at 803, the collected data is transferred to the mobile device at 803. At 804, the mobile device transfers the data to the IoT hub, an external service and/or a user. As mentioned, the mobile device may transmit the data immediately if it is already connected (e.g., via a WiFi link).

Figure 9A:
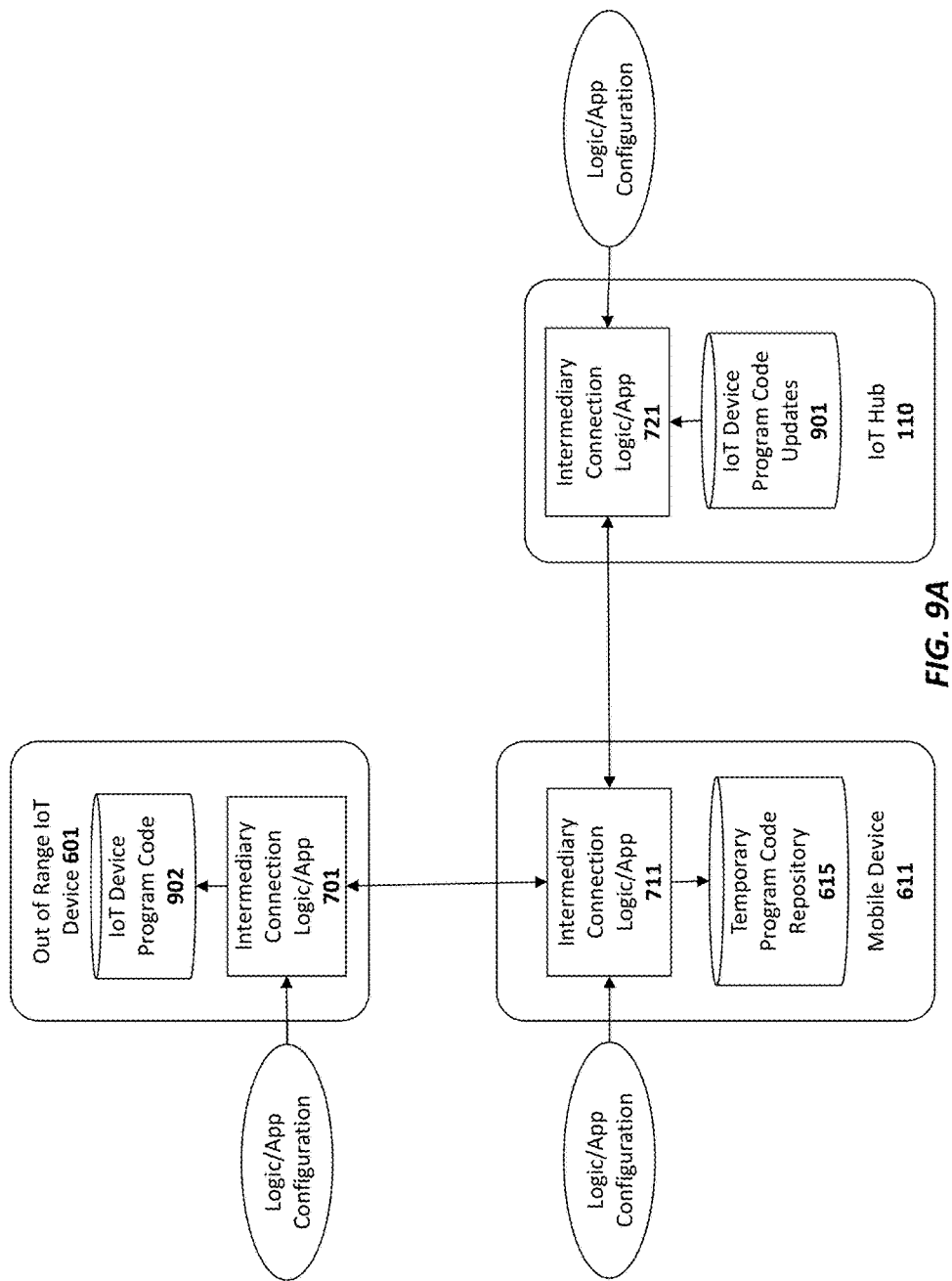
FIG. 9A illustrates an embodiment in which program code and data updates are provided to the IoT device.

In addition to collecting data from IoT devices, in one embodiment, the techniques described herein may be used to update or otherwise provide data to IoT devices. One example is shown in FIG. 9A, which shows an IoT hub 110 with program code updates 901 that need to be installed on an IoT device 601 (or a group of such IoT devices). The program code updates may include system updates, patches, configuration data and any other data needed for the IoT device to operate as desired by the user. In one embodiment, the user may specify configuration options for the IoT device 601 via a mobile device or computer which are then stored on the IoT hub 110 and provided to the IoT device using the techniques described herein. Specifically, in one embodiment, the intermediary connection logic/application 721 on the IoT hub 110 communicates with the intermediary connection logic/application 711 on the mobile device 611 to store the program code updates within a temporary storage 615. When the mobile device 611 enters the range of the IoT device 601, the intermediary connection logic/application 711 on the mobile device 611 connects with the intermediary/connection logic/application 701 on the IoT device 601 to provide the program code updates to the device. In one embodiment, the IoT device 601 may then enter into an automated update process to install the new program code updates and/or data.

A method for updating an IoT device is shown in FIG. 9B. The method may be implemented within the context of the system architectures described above, but is not limited to any particular system architectures.

At 900 new program code or data updates are made available on the IoT hub and/or an external service (e.g., coupled to the mobile device over the Internet). At 901, the mobile device receives and stores the program code or data updates on behalf of the IoT device. The IoT device and/or mobile device periodically check to determine whether a connection has been established at 902. If a connection is established, determined at 903, then at 904 the updates are transferred to the IoT device and installed.

Embodiments for Improved Security

In one embodiment, the low power microcontroller 200 of each IoT device 101 and the low power logic/microcontroller 301 of the IoT hub 110 include a secure key store for storing encryption keys used by the embodiments described below (see, e.g., FIGS. 10-15 and associated text). Alternatively, the keys may be secured in a subscriber identify module (SIM) as discussed below.

Figure 10:
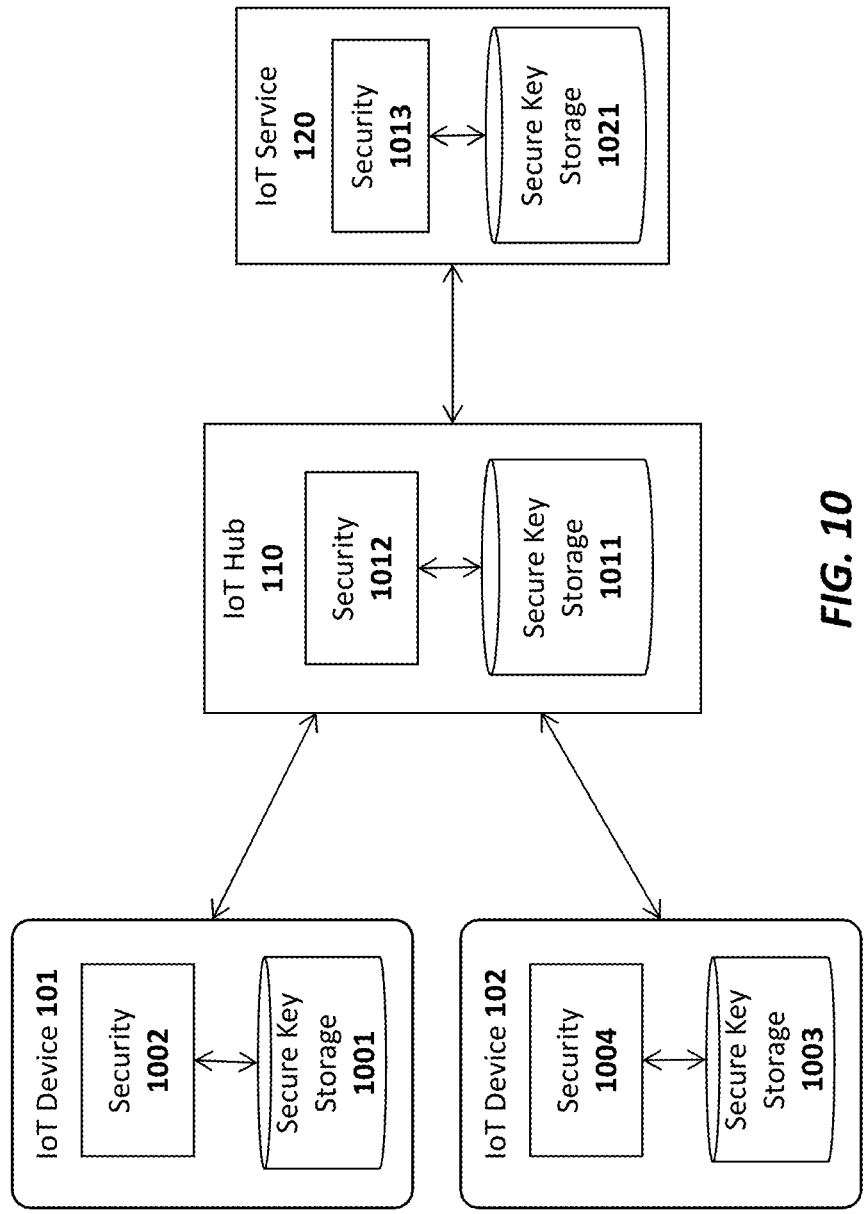
FIG. 10 illustrates a high level view of one embodiment of a security architecture.

FIG. 10 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 1001, 1003, respectively, for security storing each device's private key. Security logic 1002, 1304 then utilizes the securely stored private keys to perform the encryption/decryption operations described herein. Similarly, the IoT hub 110 includes a secure storage 1011 for storing the IoT hub private key and the public keys of the IoT devices 101-102 and the IoT service 120; as well as security logic 1012 for using the keys to perform encryption/decryption operations. Finally, the IoT service 120 may include a secure storage 1021 for security storing its own private key, the public keys of various IoT devices and IoT hubs, and a security logic 1013 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 1011.

By way of example, in one embodiment, when the IoT service 120 needs to transmit a command or data to an IoT device 101 (e.g., a command to unlock a door, a request to read a sensor, data to be processed/displayed by the IoT device, etc) the security logic 1013 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 1012 in the IoT hub is trusted, the service 120 could negotiate a session key with the hub security module 1312 and then the security module 1012 would negotiate a session key with each device 120. Messages from the service 120 would then be decrypted and verified in the hub security module 1012 before being re-encrypted for transmission to the device 101.

In one embodiment, to prevent a compromise on the hub security module 1012 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security logic 1002 on the IoT device 101 uses the public key of the IoT hub 110 to encrypt data packets sent to the IoT hub 110. The security logic 1012 on the IoT hub 110 may then decrypt the data packets using the IoT hub's private key. Similarly, the security logic 1002 on the IoT device 101 and/or the security logic 1012 on the IoT hub 110 may encrypt data packets sent to the IoT service 120 using the public key of the IoT service 120 (which may then be decrypted by the security logic 1013 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120.

Moreover, in some embodiments, the data/command itself is not encrypted, but a key is used to generate a signature over the data/command (or other data structure). The recipient may then use its key to validate the signature.

Figure 11:
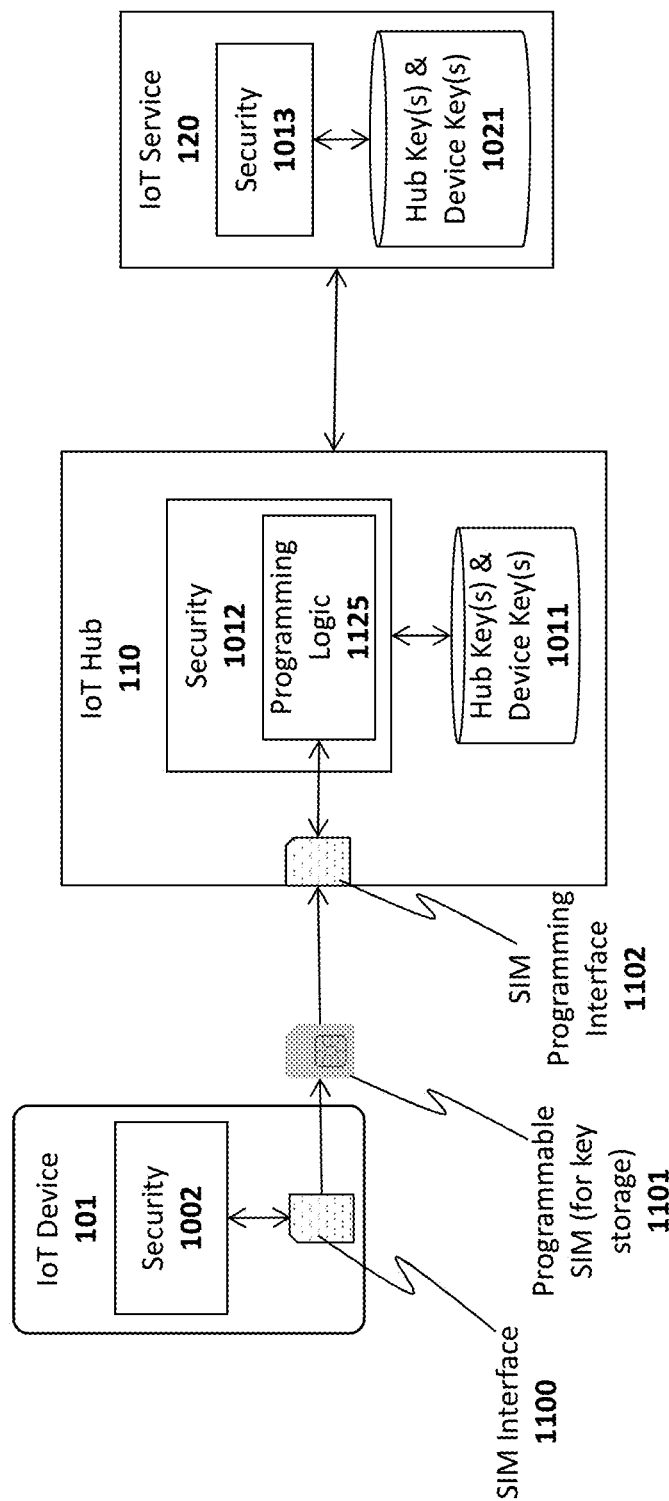
FIG. 11 illustrates one embodiment of an architecture in which a subscriber identity module (SIM) is used to store keys on IoT devices.

As illustrated in FIG. 11, in one embodiment, the secure key storage on each IoT device 101 is implemented using a programmable subscriber identity module (SIM) 1101. In this embodiment, the IoT device 101 may initially be provided to the end user with an un-programmed SIM card 1101 seated within a SIM interface 1100 on the IoT device 101. In order to program the SIM with a set of one or more encryption keys, the user takes the programmable SIM card 1101 out of the SIM interface 500 and inserts it into a SIM programming interface 1102 on the IoT hub 110. Programming logic 1125 on the IoT hub then securely programs the SIM card 1101 to register/pair the IoT device 101 with the IoT hub 110 and IoT service 120. In one embodiment, a public/private key pair may be randomly generated by the programming logic 1125 and the public key of the pair may then be stored in the IoT hub's secure storage device 411 while the private key may be stored within the programmable SIM 1101. In addition, the programming logic 525 may store the public keys of the IoT hub 110, the IoT service 120, and/or any other IoT devices 101 on the SIM card 1401 (to be used by the security logic 1302 on the IoT device 101 to encrypt outgoing data). Once the SIM 1101 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 11 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 1102 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 12A:
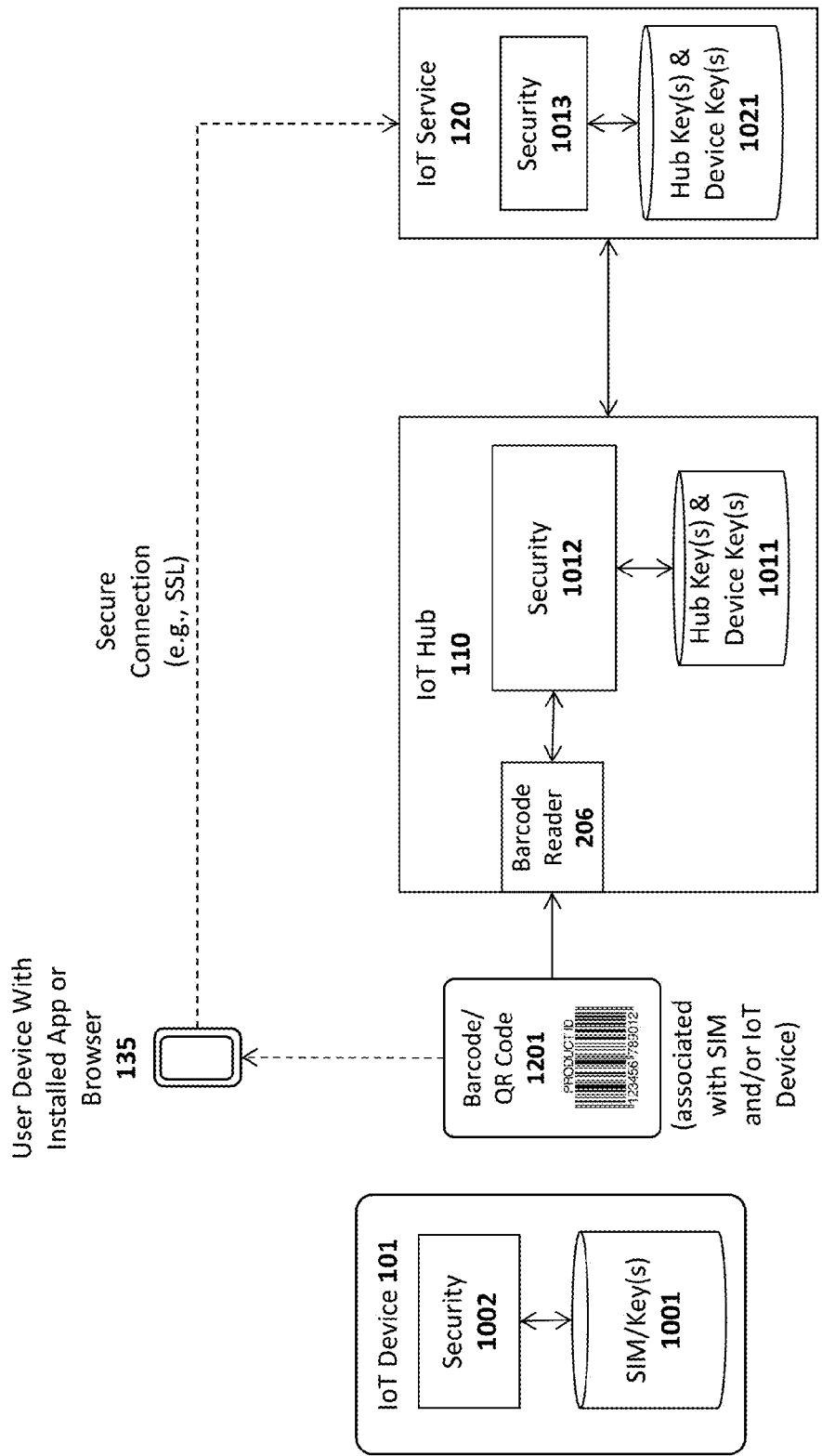
FIG. 12A illustrates one embodiment in which IoT devices are registered using barcodes or QR codes.

For example, as illustrated in FIG. 12A each IoT device 101 or SIM 401 may be packaged with a barcode or QR code 1501 uniquely identifying the IoT device 101 and/or SIM 1001. In one embodiment, the barcode or QR code 1201 comprises an encoded representation of the public key for the IoT device 101 or SIM 1001. Alternatively, the barcode or QR code 1201 may be used by the IoT hub 110 and/or IoT service 120 to identify or generate the public key (e.g., used as a pointer to the public key which is already stored in secure storage). The barcode or QR code 601 may be printed on a separate card (as shown in FIG. 12A) or may be printed directly on the IoT device itself. Regardless of where the barcode is printed, in one embodiment, the IoT hub 110 is equipped with a barcode reader 206 for reading the barcode and providing the resulting data to the security logic 1012 on the IoT hub 110 and/or the security logic 1013 on the IoT service 120. The security logic 1012 on the IoT hub 110 may then store the public key for the IoT device within its secure key storage 1011 and the security logic 1013 on the IoT service 120 may store the public key within its secure storage 1021 (to be used for subsequent encrypted communication).

In one embodiment, the data contained in the barcode or QR code 1201 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 1002 on the IoT device 101 and the security logic 1012 on the IoT hub 110 may be implemented using hardware, software, firmware or any combination thereof. For example, in one embodiment, the security logic 1002, 1012 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 1002, 1012, in one embodiment, the security logic 1002, 1012 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 1501 may be used to pair each IoT device 101 with the IoT hub 110. For example, rather than using the standard wireless pairing process currently used to pair Bluetooth LE devices, a pairing code embedded within the barcode or QR code 1501 may be provided to the IoT hub 110 to pair the IoT hub with the corresponding IoT device.

Figure 12B:
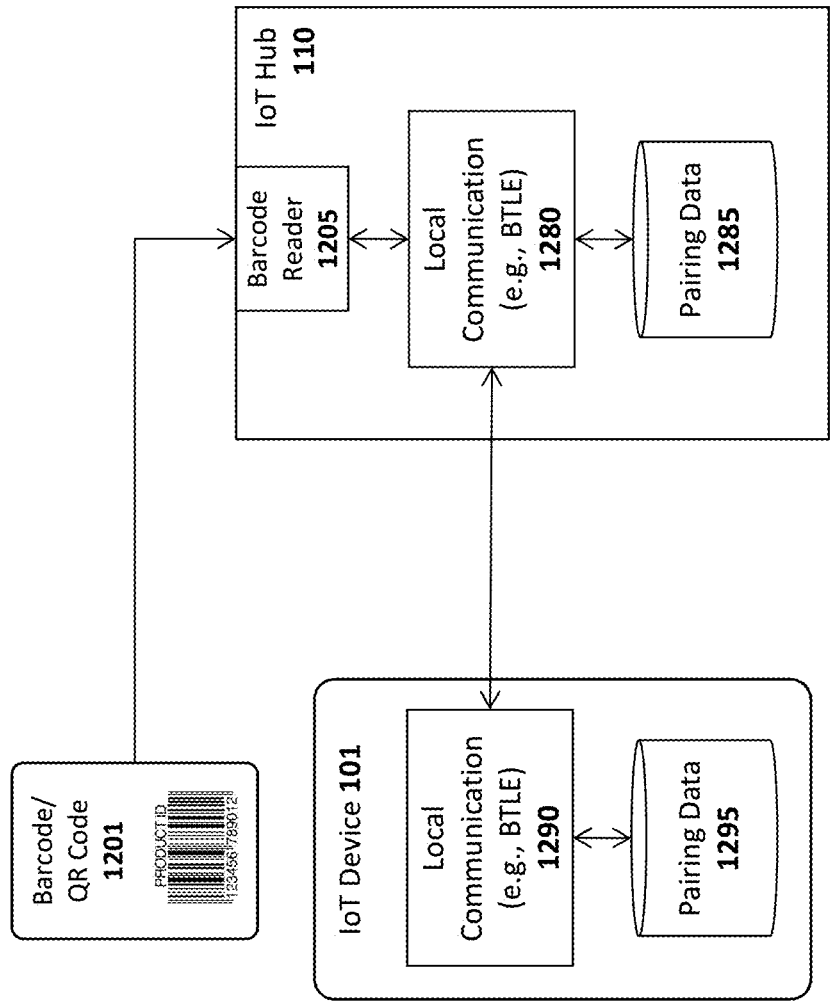
FIG. 12B illustrates one embodiment in which pairing is performed using barcodes or QR codes.

FIG. 12B illustrates one embodiment in which the barcode reader 206 on the IoT hub 110 captures the barcode/QR code 1201 associated with the IoT device 101. As mentioned, the barcode/QR code 1201 may be printed directly on the IoT device 101 or may be printed on a separate card provided with the IoT device 101. In either case, the barcode reader 206 reads the pairing code from the barcode/QR code 1201 and provides the pairing code to the local communication module 1280. In one embodiment, the local communication module 1280 is a Bluetooth LE chip and associated software, although the underlying principles of the invention are not limited to any particular protocol standard. Once the pairing code is received, it is stored in a secure storage containing pairing data 1285 and the IoT device 101 and IoT hub 110 are automatically paired. Each time the IoT hub is paired with a new IoT device in this manner, the pairing data for that pairing is stored within the secure storage 685. In one embodiment, once the local communication module 1280 of the IoT hub 110 receives the pairing code, it may use the code as a key to encrypt communications over the local wireless channel with the IoT device 101.

Similarly, on the IoT device 101 side, the local communication module 1590 stores pairing data within a local secure storage device 1595 indicating the pairing with the IoT hub. The pairing data 1295 may include the pre-programmed pairing code identified in the barcode/QR code 1201. The pairing data 1295 may also include pairing data received from the local communication module 1280 on the IoT hub 110 required for establishing a secure local communication channel (e.g., an additional key to encrypt communication with the IoT hub 110).

Thus, the barcode/QR code 1201 may be used to perform local pairing in a far more secure manner than current wireless pairing protocols because the pairing code is not transmitted over the air. In addition, in one embodiment, the same barcode/QR code 1201 used for pairing may be used to identify encryption keys to build a secure connection from the IoT device 101 to the IoT hub 110 and from the IoT hub 110 to the IoT service 120.

Figure 13:
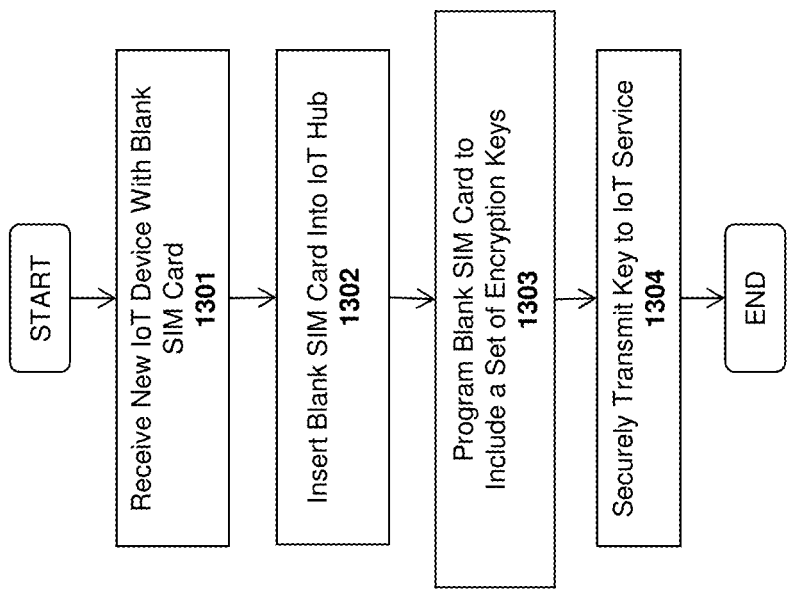
FIG. 13 illustrates one embodiment of a method for programming a SIM using an IoT hub.

A method for programming a SIM card in accordance with one embodiment of the invention is illustrated in FIG. 13. The method may be implemented within the system architecture described above, but is not limited to any particular system architecture.

At 1301, a user receives a new IoT device with a blank SIM card and, at 1602, the user inserts the blank SIM card into an IoT hub. At 1303, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 1304, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 13.

Figure 14:
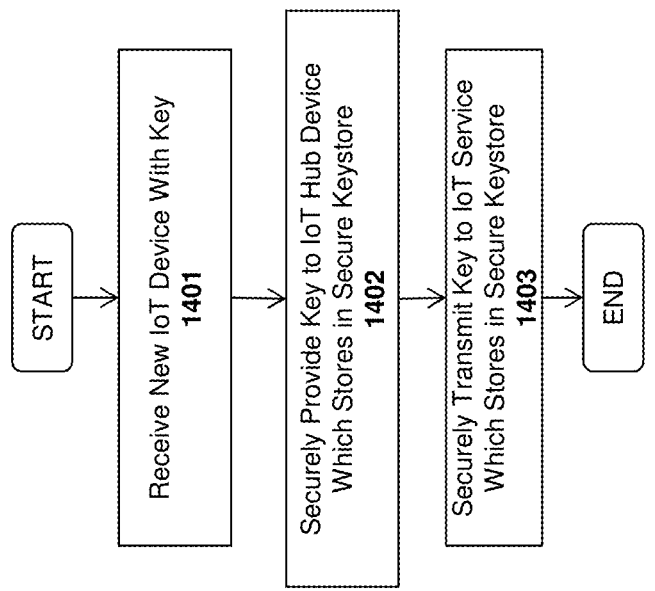
FIG. 14 illustrates one embodiment of a method for registering an IoT device with an IoT hub and IoT service.

A method for integrating a new IoT device into a network is illustrated in FIG. 14. The method may be implemented within the system architecture described above, but is not limited to any particular system architecture.

At 1401, a user receives a new IoT device to which an encryption key has been pre-assigned. At 1402, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or browser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 803, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/removal of the stored keys.

Figure 15:
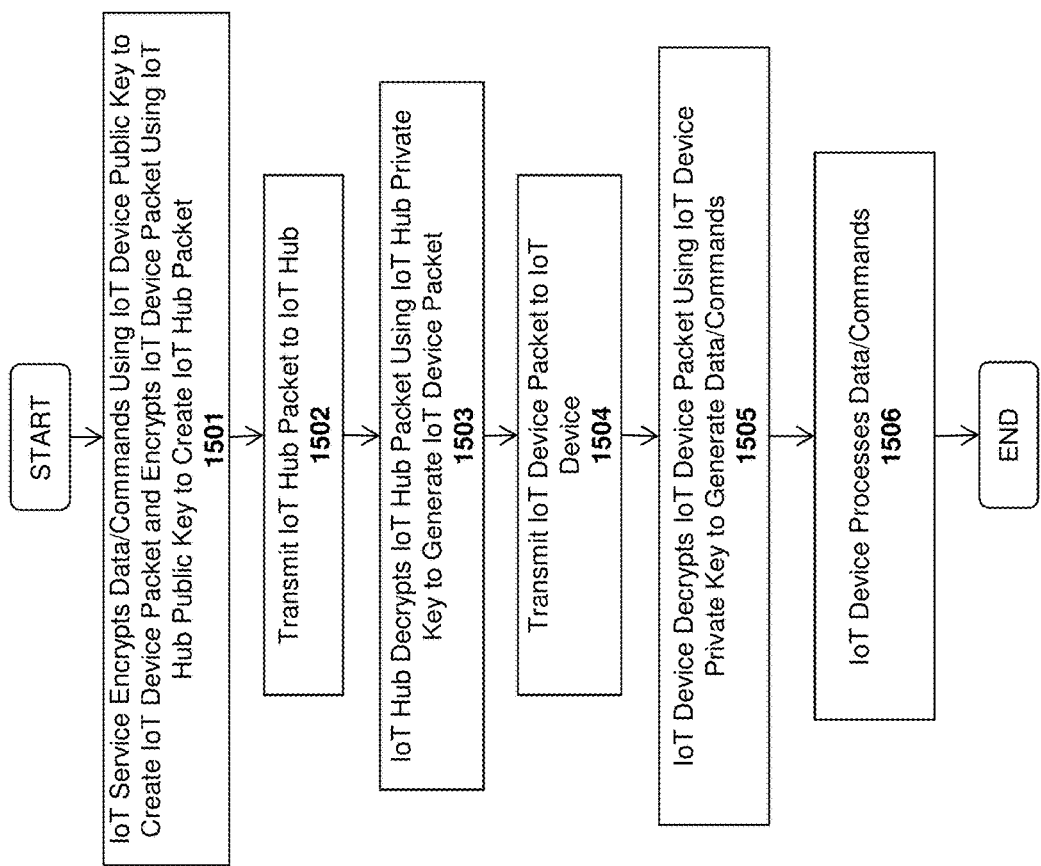
FIG. 15 illustrates one embodiment of a method for encrypting data to be transmitted to an IoT device.

A method for securely communicating commands/data to an IoT device using public/private keys is illustrated in FIG. 15. The method may be implemented within the system architecture described above, but is not limited to any particular system architecture.

At 1501, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1502, the IoT service transmits the IoT hub packet to the IoT hub. At 1503, the IoT hub decrypts the IoT hub packet using the IoT hub's private key to generate the IoT device packet. At 1504 it then transmits the IoT device packet to the IoT device which, at 1505, decrypts the IoT device packet using the IoT device private key to generate the data/commands. At 1506, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Apparatus and Method for Establishing Secure
Communication Channels in an Internet of Things
(IoT) System In one embodiment of the invention, encryption and decryption of data is performed between the IoT service 120 and each IoT device 101, regardless of the intermediate devices used to support the communication channel (e.g., such as the user's mobile device 611 and/or the IoT hub 110). One embodiment which communicates via an IoT hub 110 is illustrated in FIG. 16A and another embodiment which does not require an IoT hub is illustrated in FIG. 16B.

Figure 16A:
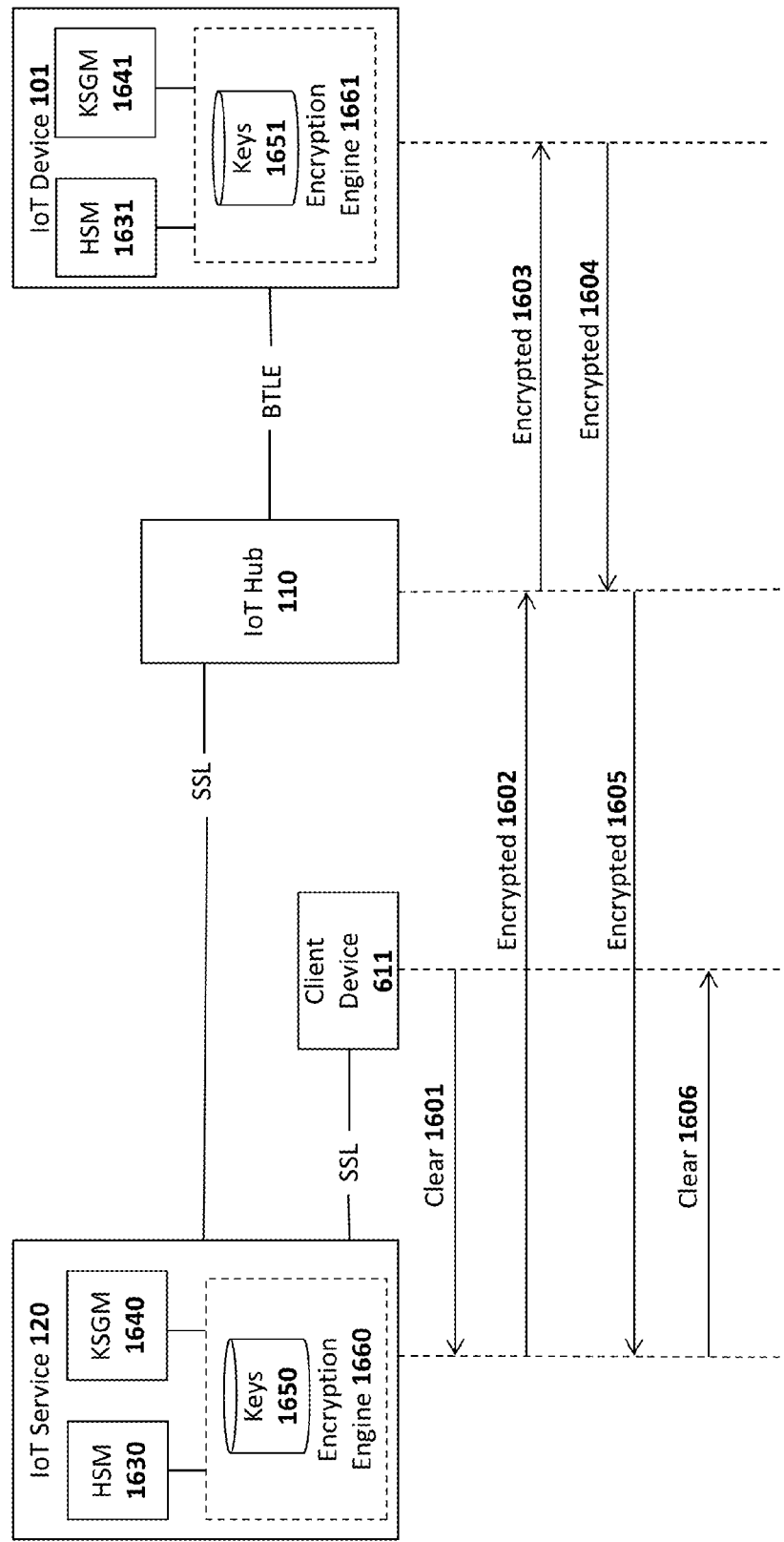
FIGS. 16A-B illustrate different embodiments of the invention for encrypting data between an IoT service and an IoT device.
Figure 16B:
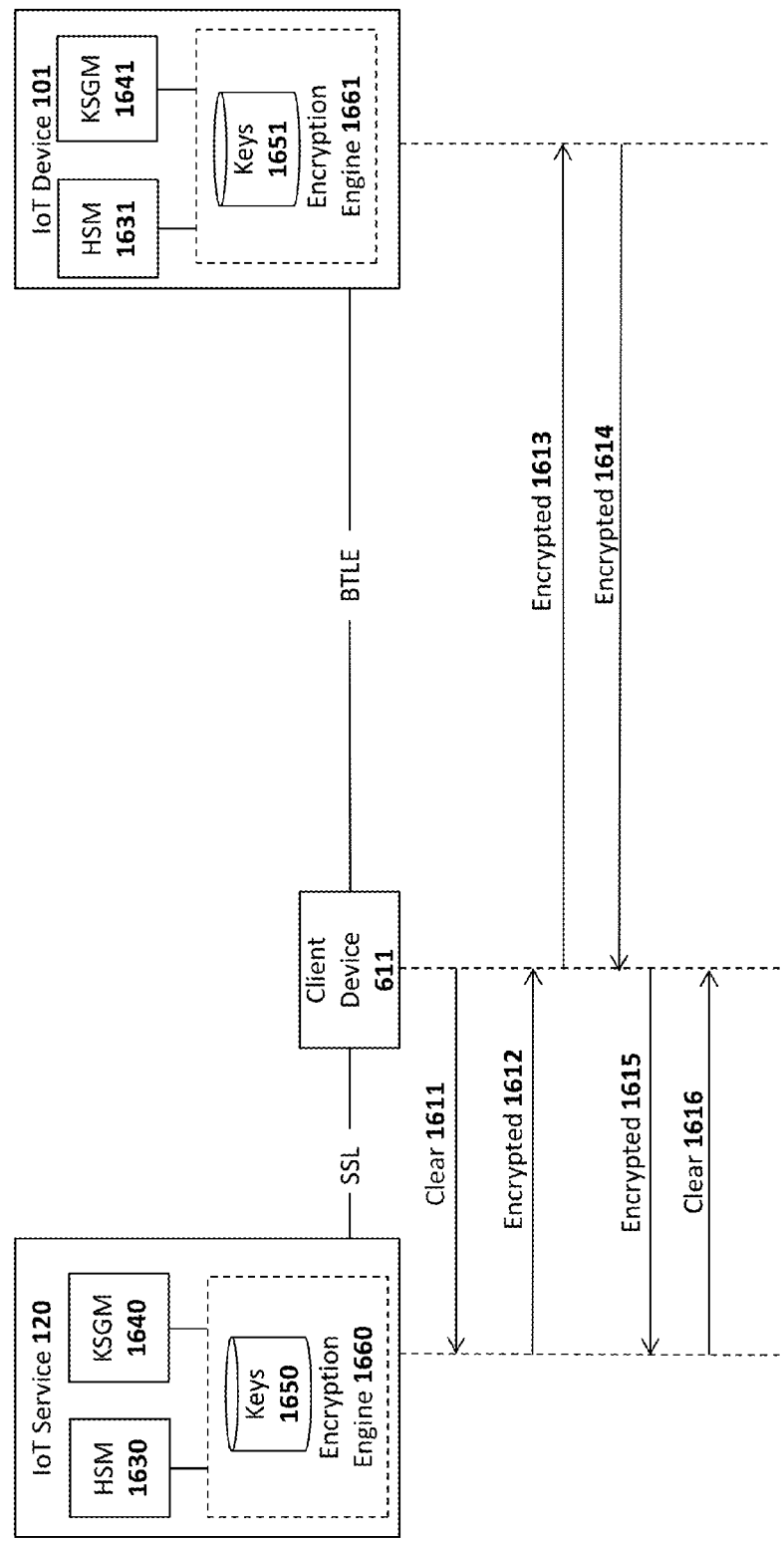

Turning first to FIG. 16A, the IoT service 120 includes an encryption engine 1660 which manages a set of "service session keys" 1650 and each IoT device 101 includes an encryption engine 1661 which manages a set of "device session keys" 1651 for encrypting/decrypting communication between the IoT device 101 and IoT service 120. The encryption engines may rely on different hardware modules when performing the security/encryption techniques described herein including a hardware security module 1630-1631 for (among other things) generating a session public/private key pair and preventing access to the private session key of the pair and a key stream generation module 1640-1641 for generating a key stream using a derived secret. In one embodiment, the service session keys 1650 and the device session keys 1651 comprise related public/private key pairs. For example, in one embodiment, the device session keys 1651 on the IoT device 101 include a public key of the IoT service 120 and a private key of the IoT device 101. As discussed in detail below, in one embodiment, to establish a secure communication session, the public/private session key pairs, 1650 and 1651, are used by each encryption engine, 1660 and 1661, respectively, to generate the same secret which is then used by the SKGMs 1640-1641 to generate a key stream to encrypt and decrypt communication between the IoT service 120 and the IoT device 101. Additional details associated with generation and use of the secret in accordance with one embodiment of the invention are provided below.

In FIG. 16A, once the secret has been generated using the keys 1650-1651, the client will always send messages to the IoT device 101 through the IoT service 120, as indicated by Clear transaction 1611. "Clear" as used herein is meant to indicate that the underlying message is not encrypted using the encryption techniques described herein. However, as illustrated, in one embodiment, a secure sockets layer (SSL) channel or other secure channel (e.g., an Internet Protocol Security (IPSEC) channel) is established between the client device 611 and IoT service 120 to protect the communication. The encryption engine 1660 on the IoT service 120 then encrypts the message using the generated secret and transmits the encrypted message to the IoT hub 110 at 1602. Rather than using the secret to encrypt the message directly, in one embodiment, the secret and a counter value are used to generate a key stream, which is used to encrypt each message packet. Details of this embodiment are described below with respect to FIG. 17.

As illustrated, an SSL connection or other secure channel may be established between the IoT service 120 and the IoT hub 110. The IoT hub 110 (which does not have the ability to decrypt the message in one embodiment) transmits the encrypted message to the IoT device at 1603 (e.g., over a Bluetooth Low Energy (BTLE) communication channel). The encryption engine 1661 on the IoT device 101 may then decrypt the message using the secret and process the message contents. In an embodiment which uses the secret to generate a key stream, the encryption engine 1661 may generate the key stream using the secret and a counter value and then use the key stream for decryption of the message packet.

The message itself may comprise any form of communication between the IoT service 120 and IoT device 101. For example, the message may comprise a command packet instructing the IoT device 101 to perform a particular function such as taking a measurement and reporting the result back to the client device 611 or may include configuration data to configure the operation of the IoT device 101.

If a response is required, the encryption engine 1661 on the IoT device 101 uses the secret or a derived key stream to encrypt the response and transmits the encrypted response to the IoT hub 110 at 1604, which forwards the response to the IoT service 120 at 1605. The encryption engine 1660 on the IoT service 120 then decrypts the response using the secret or a derived key stream and transmits the decrypted response to the client device 611 at 1606 (e.g., over the SSL or other secure communication channel).

FIG. 16B illustrates an embodiment which does not require an IoT hub. Rather, in this embodiment, communication between the IoT device 101 and IoT service 120 occurs through the client device 611 (e.g., as in the embodiments described above with respect to FIGS. 6-9B). In this embodiment, to transmit a message to the IoT device 101 the client device 611 transmits an unencrypted version of the message to the IoT service 120 at 1611. The encryption engine 1660 encrypts the message using the secret or the derived key stream and transmits the encrypted message back to the client device 611 at 1612. The client device 611 then forwards the encrypted message to the IoT device 101 at 1613, and the encryption engine 1661 decrypts the message using the secret or the derived key stream. The IoT device 101 may then process the message as described herein. If a response is required, the encryption engine 1661 encrypts the response using the secret and transmits the encrypted response to the client device 611 at 1614, which forwards the encrypted response to the IoT service 120 at 1615. The encryption engine 1660 then decrypts the response and transmits the decrypted response to the client device 611 at 1616.

Figure 17:
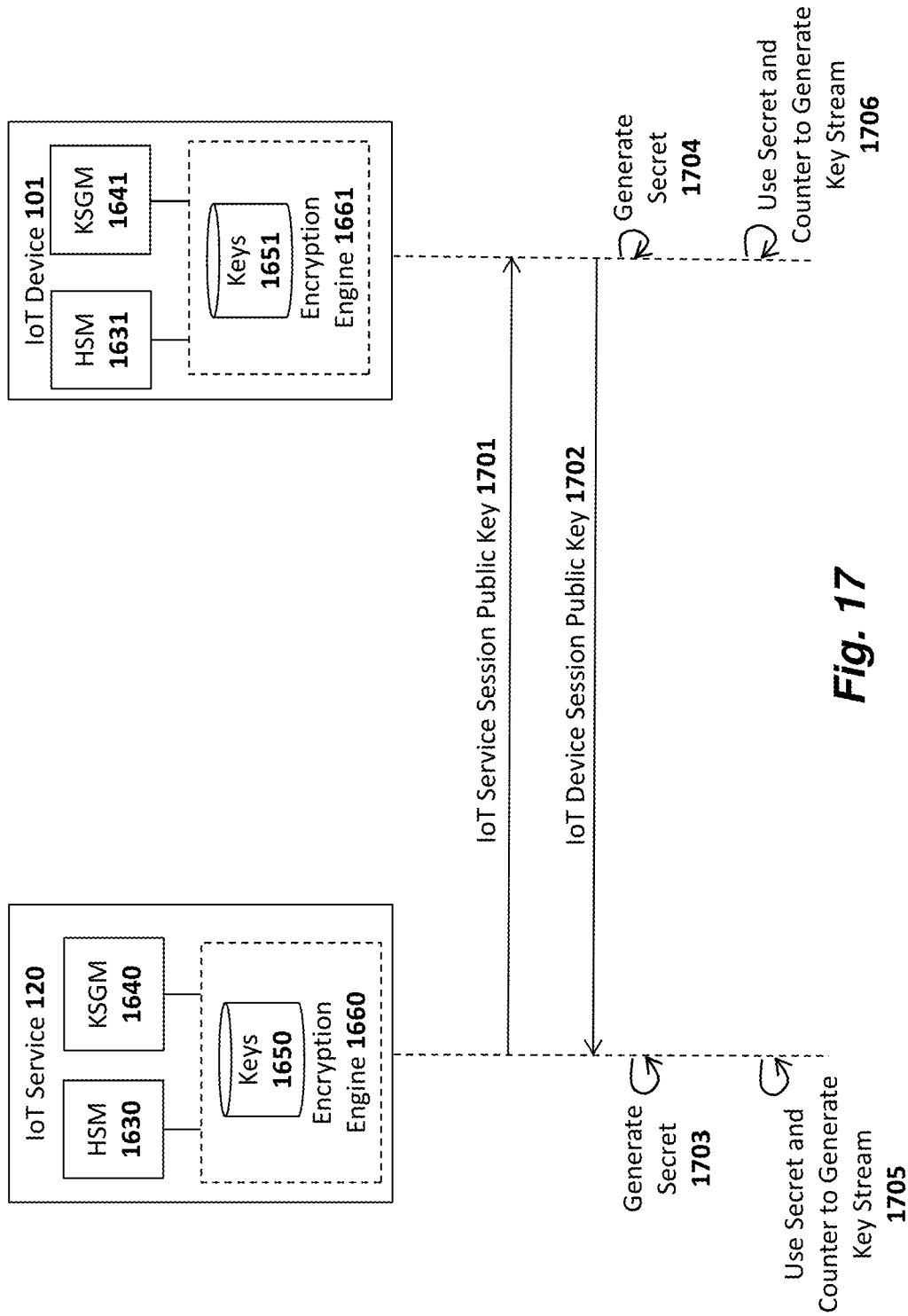
FIG. 17 illustrates embodiments of the invention for performing a secure key exchange, generating a common secret, and using the secret to generate a key stream.

FIG. 17 illustrates a key exchange and key stream generation which may initially be performed between the IoT service 120 and the IoT device 101. In one embodiment, this key exchange may be performed each time the IoT service 120 and IoT device 101 establish a new communication session. Alternatively, the key exchange may be performed and the exchanged session keys may be used for a specified period of time (e.g., a day, a week, etc). While no intermediate devices are shown in FIG. 17 for simplicity, communication may occur through the IoT hub 110 and/or the client device 611.

In one embodiment, the encryption engine 1660 of the IoT service 120 sends a command to the HSM 1630 (e.g., which may be such as a CloudHSM offered by Amazon®) to generate a session public/private key pair. The HSM 1630 may subsequently prevent access to the private session key of the pair. Similarly, the encryption engine on the IoT device 101 may transmit a command to the HSM 1631 (e.g., such as an Atecc508 HSM from Atmel Corporation®) which generates a session public/private key pair and prevents access to the session private key of the pair. Of course, the underlying principles of the invention are not limited to any specific type of encryption engine or manufacturer.

In one embodiment, the IoT service 120 transmits its session public key generated using the HSM 1630 to the IoT device 101 at 1701. The IoT device uses its HSM 1631 to generate its own session public/private key pair and, at 1702, transmits its public key of the pair to the IoT service 120. In one embodiment, the encryption engines 1660-1661 use an Elliptic curve Diffie-Hellman (ECDH) protocol, which is an anonymous key agreement that allows two parties with an elliptic curve public-private key pair, to establish a shared secret. In one embodiment, using these techniques, at 1703, the encryption engine 1660 of the IoT service 120 generates the secret using the IoT device session public key and its own session private key. Similarly, at 1704, the encryption engine 1661 of the IoT device 101 independently generates the same secret using the IoT service 120 session public key and its own session private key. More specifically, in one embodiment, the encryption engine 1660 on the IoT service 120 generates the secret according to the formula secret=IoT device session pub key*IoT service session private key, where "*" means that the IoT device session public key is point-multiplied by the IoT service session private key. The encryption engine 1661 on the IoT device 101 generates the secret according to the formula secret=IoT service session pub key*IoT device session private key, where the IoT service session public key is point multiplied by the IoT device session private key. In the end, the IoT service 120 and IoT device 101 have both generated the same secret to be used to encrypt communication as described below. In one embodiment, the encryption engines 1660-1661 rely on a hardware module such as the KSGMs 1640-1641 respectively to perform the above operations for generating the secret.

Once the secret has been determined, it may be used by the encryption engines 1660 and 1661 to encrypt and decrypt data directly. Alternatively, in one embodiment, the encryption engines 1660-1661 send commands to the KSGMs 1640-1641 to generate a new key stream using the secret to encrypt/decrypt each data packet (i.e., a new key stream data structure is generated for each packet). In particular, one embodiment of the key stream generation module 1640-1641 implements a Galois/Counter Mode (GCM) in which a counter value is incremented for each data packet and is used in combination with the secret to generate the key stream. Thus, to transmit a data packet to the IoT service 120, the encryption engine 1661 of the IoT device 101 uses the secret and the current counter value to cause the KSGMs 1640-1641 to generate a new key stream and increment the counter value for generating the next key stream. The newly-generated key stream is then used to encrypt the data packet prior to transmission to the IoT service 120. In one embodiment, the key stream is XORed with the data to generate the encrypted data packet. In one embodiment, the IoT device 101 transmits the counter value with the encrypted data packet to the IoT service 120. The encryption engine 1660 on the IoT service then communicates with the KSGM 1640 which uses the received counter value and the secret to generate the key stream (which should be the same key stream because the same secret and counter value are used) and uses the generated key stream to decrypt the data packet.

In one embodiment, data packets transmitted from the IoT service 120 to the IoT device 101 are encrypted in the same manner. Specifically, a counter is incremented for each data packet and used along with the secret to generate a new key stream. The key stream is then used to encrypt the data (e.g., performing an XOR of the data and the key stream) and the encrypted data packet is transmitted with the counter value to the IoT device 101. The encryption engine 1661 on the IoT device 101 then communicates with the KSGM 1641 which uses the counter value and the secret to generate the same key stream which is used to decrypt the data packet. Thus, in this embodiment, the encryption engines 1660-1661 use their own counter values to generate a key stream to encrypt data and use the counter values received with the encrypted data packets to generate a key stream to decrypt the data.

In one embodiment, each encryption engine 1660-1661 keeps track of the last counter value it received from the other and includes sequencing logic to detect whether a counter value is received out of sequence or if the same counter value is received more than once. If a counter value is received out of sequence, or if the same counter value is received more than once, this may indicate that a replay attack is being attempted. In response, the encryption engines 1660-1661 may disconnect from the communication channel and/or may generate a security alert.

Figure 18:
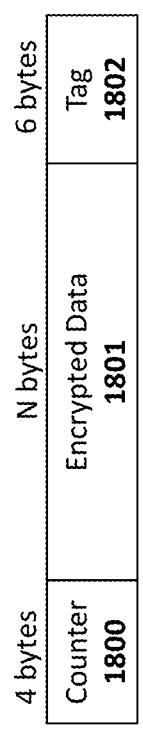
FIG. 18 illustrates a packet structure in accordance with one embodiment of the invention.

FIG. 18 illustrates an exemplary encrypted data packet employed in one embodiment of the invention comprising a 4-byte counter value 1800, a variable-sized encrypted data field 1801, and a 6-byte tag 1802. In one embodiment, the tag 1802 comprises a checksum value to validate the decrypted data (once it has been decrypted).

As mentioned, in one embodiment, the session public/private key pairs 1650-1651 exchanged between the IoT service 120 and IoT device 101 may be generated periodically and/or in response to the initiation of each new communication session.

One embodiment of the invention implements additional techniques for authenticating sessions between the IoT service 120 and IoT device 101. In particular, in one embodiment, hierarchy of public/private key pairs is used including a master key pair, a set of factory key pairs, and a set of IoT service key pairs, and a set of IoT device key pairs. In one embodiment, the master key pair comprises a root of trust for all of the other key pairs and is maintained in a single, highly secure location (e.g., under the control of the organization implementing the IoT systems described herein). The master private key may be used to generate signatures over (and thereby authenticate) various other key pairs such as the factory key pairs. The signatures may then be verified using the master public key. In one embodiment, each factory which manufactures IoT devices is assigned its own factory key pair which may then be used to authenticate IoT service keys and IoT device keys. For example, in one embodiment, a factory private key is used to generate a signature over IoT service public keys and IoT device public keys. These signature may then be verified using the corresponding factory public key. Note that these IoT service/device public keys are not the same as the "session" public/private keys described above with respect to FIGS. 16A-B. The session public/private keys described above are temporary (i.e., generated for a service/device session) while the IoT service/device key pairs are permanent (i.e., generated at the factory).

With the foregoing relationships between master keys, factory keys, service/device keys in mind, one embodiment of the invention performs the following operations to provide additional layers of authentication and security between the IoT service 120 and IoT device 101:

A. In one embodiment, the IoT service 120 initially generates a message containing the following:
  1. The IoT service's unique ID:
     The IoT service's serial number;
     a Timestamp;
     The ID of the factory key used to sign this unique ID;
     a Class of the unique ID (i.e., a service);
     IoT service's public key
     The signature over the unique ID.
  2. The Factory Certificate including:
     A timestamp
     The ID of the master key used to sign the certificate
     The factory public key
     The signature of the Factory Certificate
  3. IoT service session public key (as described above with respect to FIGS. 16A-B)
  4. IoT service session public key signature (e.g., signed with the IoT service's private key)

B. In one embodiment, the message is sent to the IoT device on the negotiation channel (described below). The IoT device parses the message and:
  1. Verifies the signature of the factory certificate (only if present in the message payload)
  2. Verifies the signature of the unique ID using the key identified by the unique ID
  3. Verifies the IoT service session public key signature using the IoT service's public key from the unique ID
  4. Saves the IoT service's public key as well as the IoT service's session public key
  5. Generates the IoT device session key pair C. The IoT device then generates a message containing the following:
  1. IoT device's unique ID
     IoT device serial number
     Timestamp
     ID of factory key used to sign this unique ID
     Class of unique ID (i.e., IoT device)
     IoT device's public key
     Signature of unique ID
  2. IoT device's session public key
  3. Signature of (IoT device session public key+IoT service session public key) signed with IoT device's key D. This message is sent back to the IoT service. The IoT service parses the message and:
  1. Verifies the signature of the unique ID using the factory public key 2. Verifies the signature of the session public keys using the IoT device's public key
3. Saves the IoT device's session public key
E. The IoT service then generates a message containing a signature of (IoT device session public key+IoT service session public key) signed with the IoT service's key.
F. The IoT device parses the message and:
1. Verifies the signature of the session public keys using the IoT service's public key
2. Generates the key stream from the IoT device session private key and the IoT service's session public key
3. The IoT device then sends a "messaging available" message.
G. The IoT service then does the following:
1. Generates the key stream from the IoT service session private key and the IoT device's session public key
2. Creates a new message on the messaging channel which contains the following:
Generates and stores a random 2 byte value
Set attribute message with the boomerang attribute Id (discussed below) and the random value
H. The IoT device receives the message and:
1. Attempts to decrypt the message
2. Emits an Update with the same value on the indicated attribute Id
I. The IoT service recognizes the message payload contains a boomerang attribute update and:
1. Sets its paired state to true
2. Sends a pairing complete message on the negotiator channel
J. IoT device receives the message and sets his paired state to true While the above techniques are described with respect to an "IoT service" and an "IoT device," the underlying principles of the invention may be implemented to establish a secure communication channel between any two devices including user client devices, servers, and Internet services.

The above techniques are highly secure because the private keys are never shared over the air (in contrast to current Bluetooth pairing techniques in which a secret is transmitted from one party to the other). An attacker listening to the entire conversation will only have the public keys, which are insufficient to generate the shared secret. These techniques also prevent a man-in-the-middle attack by exchanging signed public keys. In addition, because GCM and separate counters are used on each device, any kind of "replay attack" (where a man in the middle captures the data and sends it again) is prevented. Some embodiments also prevent replay attacks by using asymmetrical counters.

Techniques for Exchanging Data and Commands without Formally Pairing Devices

GATT is an acronym for the Generic Attribute Profile, and it defines the way that two Bluetooth Low Energy (BTLE) devices transfer data back and forth. It makes use of a generic data protocol called the Attribute Protocol (ATT), which is used to store Services, Characteristics and related data in a simple lookup table using 16-bit Characteristic IDs for each entry in the table. Note that while the "characteristics" are sometimes referred to as "attributes."

On Bluetooth devices, the most commonly used characteristic is the devices "name" (having characteristic ID 10752 (0x2A00)). For example, a Bluetooth device may identify other Bluetooth devices within its vicinity by reading the "Name" characteristic published by those other Bluetooth devices using GATT. Thus, Bluetooth device have the inherent ability to exchange data without formally pairing/bonding the devices (note that "paring" and "bonding" are sometimes used interchangeably; the remainder of this discussion will use the term "pairing").

One embodiment of the invention takes advantage of this capability to communicate with BTLE-enabled IoT devices without formally pairing with these devices. Pairing with each individual IoT device would extremely inefficient because of the amount of time required to pair with each device and because only one paired connection may be established at a time.

Figure 19:
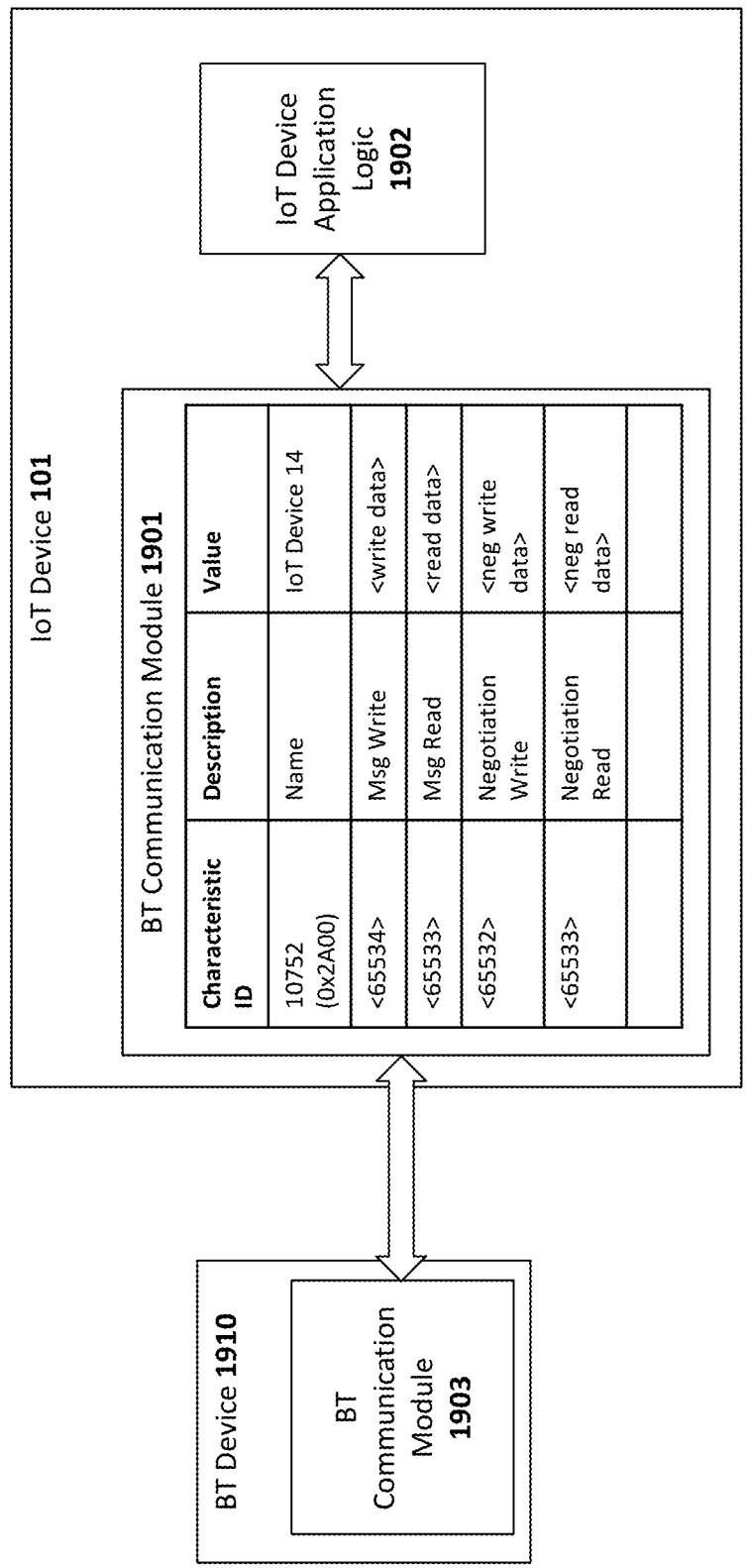
FIG. 19 illustrates techniques employed in one embodiment for writing and reading data to/from an IoT device without formally pairing with the IoT device.

FIG. 19 illustrates one particular embodiment in which a Bluetooth (BT) device 1910 establishes a network socket abstraction with a BT communication module 1901 of an IoT device 101 without formally establishing a paired BT connection. The BT device 1910 may be included in an IoT hub 110 and/or a client device 611 such as shown in FIG. 16A. As illustrated, the BT communication module 1901 maintains a data structure containing a list of characteristic IDs, names associated with those characteristic IDs and values for those characteristic IDs. The value for each characteristic may be stored within a 20-byte buffer identified by the characteristic ID in accordance with the current BT standard. However, the underlying principles of the invention are not limited to any particular buffer size.

In the example in FIG. 19, the "Name" characteristic is a BT-defined characteristic which is assigned a specific value of "IoT Device 14." One embodiment of the invention specifies a first set of additional characteristics to be used for negotiating a secure communication channel with the BT device 1910 and a second set of additional characteristics to be used for encrypted communication with the BT device 1910. In particular, a "negotiation write" characteristic, identified by characteristic ID <65532> in the illustrated example, may be used to transmit outgoing negotiation messages and the "negotiation read" characteristic, identified by characteristic ID <65533> may be used to receive incoming negotiation messages. The "negotiation messages" may include messages used by the BT device 1910 and the BT communication module 1901 to establish a secure communication channel as described herein. By way of example, in FIG. 17, the IoT device 101 may receive the IoT service session public key 1701 via the "negotiation read" characteristic <65533>. The key 1701 may be transmitted from the IoT service 120 to a BTLE-enabled IoT hub 110 or client device 611 which may then use GATT to write the key 1701 to the negotiation read value buffer identified by characteristic ID <65533>. IoT device application logic 1902 may then read the key 1701 from the value buffer identified by characteristic ID <65533> and process it as described above (e.g., using it to generate a secret and using the secret to generate a key stream, etc).

If the key 1701 is greater than 20 bytes (the maximum buffer size in some current implementations), then it may be written in 20-byte portions. For example, the first 20 bytes may be written by the BT communication module 1903 to characteristic ID <65533> and read by the IoT device application logic 1902, which may then write an acknowledgement message to the negotiation write value buffer identified by characteristic ID <65532>. Using GATT, the BT communication module 1903 may read this acknowledgement from characteristic ID <65532> and responsively write the next 20 bytes of the key 1701 to the negotiation read value buffer identified by characteristic ID <65533>. In this manner, a network socket abstraction defined by characteristic IDs <65532> and <65533> is established for exchanging negotiation messages used to establish a secure communication channel.

In one embodiment, once the secure communication channel is established, a second network socket abstraction is established using characteristic ID <65534> (for transmitting encrypted data packets from IoT device 101) and characteristic ID <65533> (for receiving encrypted data packets by IoT device). That is, when BT communication module 1903 has an encrypted data packet to transmit (e.g., such as encrypted message 1603 in FIG. 16A), it starts writing the encrypted data packet, 20 bytes at a time, using the message read value buffer identified by characteristic ID <65533>. The IoT device application logic 1902 will then read the encrypted data packet, 20 bytes at a time, from the read value buffer, sending acknowledgement messages to the BT communication module 1903 as needed via the write value buffer identified by characteristic ID <65532>.

In one embodiment, the commands of GET, SET, and UPDATE described below are used to exchange data and commands between the two BT communication modules 1901 and 1903. For example, the BT communication module 1903 may send a packet identifying characteristic ID <65533> and containing the SET command to write into the value field/buffer identified by characteristic ID <65533> which may then be read by the IoT device application logic 1902. To retrieve data from the IoT device 101, the BT communication module 1903 may transmit a GET command directed to the value field/buffer identified by characteristic ID <65534>. In response to the GET command, the BT communication module 1901 may transmit an UPDATE packet to the BT communication module 1903 containing the data from the value field/buffer identified by characteristic ID <65534>. In addition, UPDATE packets may be transmitted automatically, in response to changes in a particular attribute on the IoT device 101. For example, if the IoT device is associated with a lighting system and the user turns on the lights, then an UPDATE packet may be sent to reflect the change to the on/off attribute associated with the lighting application.

Figure 20:
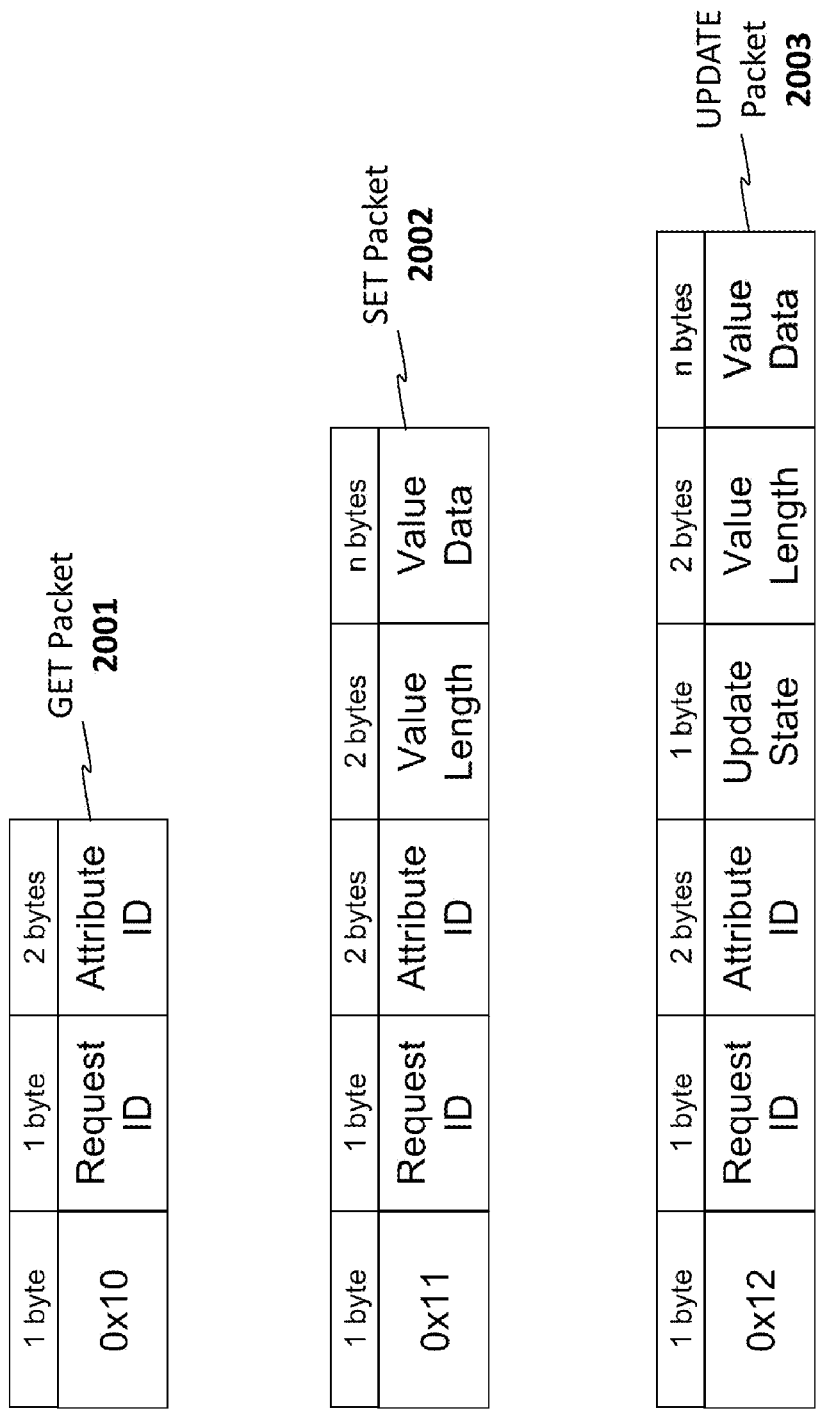
FIG. 20 illustrates an exemplary set of command packets employed in one embodiment of the invention.

FIG. 20 illustrates exemplary packet formats used for GET, SET, and UPDATE in accordance with one embodiment of the invention. In one embodiment, these packets are transmitted over the message write <65534> and message read <65533> channels following negotiation. In the GET packet 2001, a first 1-byte field includes a value (0X10) which identifies the packet as a GET packet. A second 1-byte field includes a request ID, which uniquely identifies the current GET command (i.e., identifies the current transaction with which the GET command is associated). For example, each instance of a GET command transmitted from a service or device may be assigned a different request ID. This may be done, for example, by incrementing a counter and using the counter value as the request ID. However, the underlying principles of the invention are not limited to any particular manner for setting the request ID.

A 2-byte attribute ID identifies the application-specific attribute to which the packet is directed. For example, if the GET command is being sent to IoT device 101 illustrated in FIG. 19, the attribute ID may be used to identify the particular application-specific value being requested. Returning to the above example, the GET command may be directed to an application-specific attribute ID such as power status of a lighting system, which comprises a value identifying whether the lights are powered on or off (e.g., 1=on, 0=off). If the IoT device 101 is a security apparatus associated with a door, then the value field may identify the current status of the door (e.g., 1=opened, 0=closed). In response to the GET command, a response may be transmitting containing the current value identified by the attribute ID.

The SET packet 2002 and UPDATE packet 2003 illustrated in FIG. 20 also include a first 1-byte field identifying the type of packet (i.e., SET and UPDATE), a second 1-byte field containing a request ID, and a 2-byte attribute ID field identifying an application-defined attribute. In addition, the SET packet includes a 2-byte length value identifying the length of data contained in an n-byte value data field. The value data field may include a command to be executed on the IoT device and/or configuration data to configure the operation of the IoT device in some manner (e.g., to set a desired parameter, to power down the IoT device, etc). For example, if the IoT device 101 controls the speed of a fan, the value field may reflect the current fan speed.

The UPDATE packet 2003 may be transmitted to provide an update of the results of the SET command. The UPDATE packet 2003 includes a 2-byte length value field to identify the length of the n-byte value data field which may include data related to the results of the SET command. In addition, a 1-byte update state field may identify the current state of the variable being updated. For example, if the SET command attempted to turn off a light controlled by the IoT device, the update state field may indicate whether the light was successfully turned off.

Figure 21:
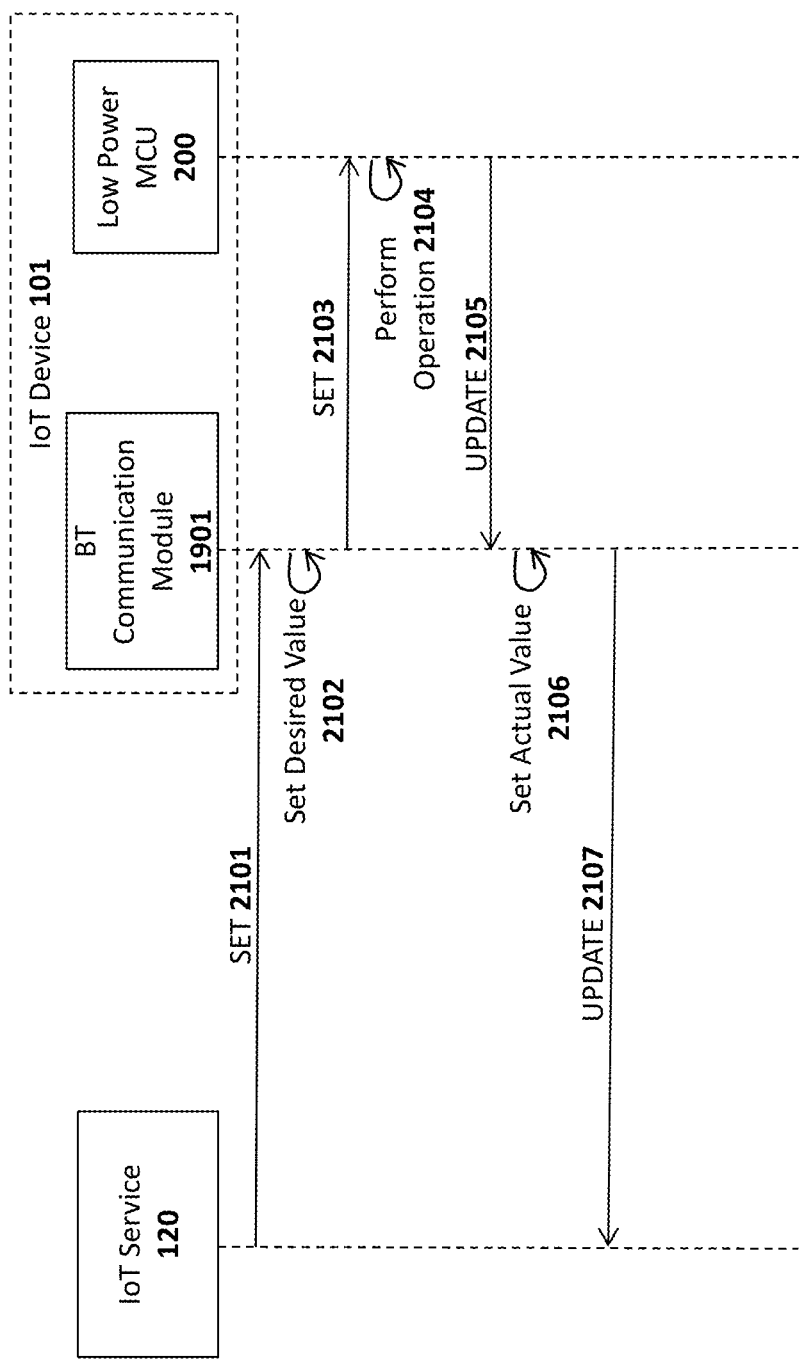
FIG. 21 illustrates an exemplary sequence of transactions using command packets.

FIG. 21 illustrates an exemplary sequence of transactions between the IoT service 120 and an IoT device 101 involving the SET and UPDATE commands. Intermediary devices such as the IoT hub and the user's mobile device are not shown to avoid obscuring the underlying principles of the invention. At 2101, the SET command 2101 is transmitted form the IoT service to the IoT device 101 and received by the BT communication module 1901 which responsively updates the GATT value buffer identified by the characteristic ID at 2102. The SET command is read from the value buffer by the low power microcontroller (MCU) 200 at 2103 (or by program code being executed on the low power MCU such as IoT device application logic 1902 shown in FIG. 19). At 2104, the MCU 200 or program code performs an operation in response to the SET command. For example, the SET command may include an attribute ID specifying a new configuration parameter such as a new temperature or may include a state value such as on/off (to cause the IoT device to enter into an "on" or a low power state). Thus, at 2104, the new value is set in the IoT device and an UPDATE command is returned at 2105 and the actual value is updated in a GATT value field at 2106. In some cases, the actual value will be equal to the desired value. In other cases, the updated value may be different (i.e., because it may take time for the IoT device 101 to update certain types of values). Finally, at 2107, the UPDATE command is transmitted back to the IoT service 120 containing the actual value from the GATT value field.

Figure 22:
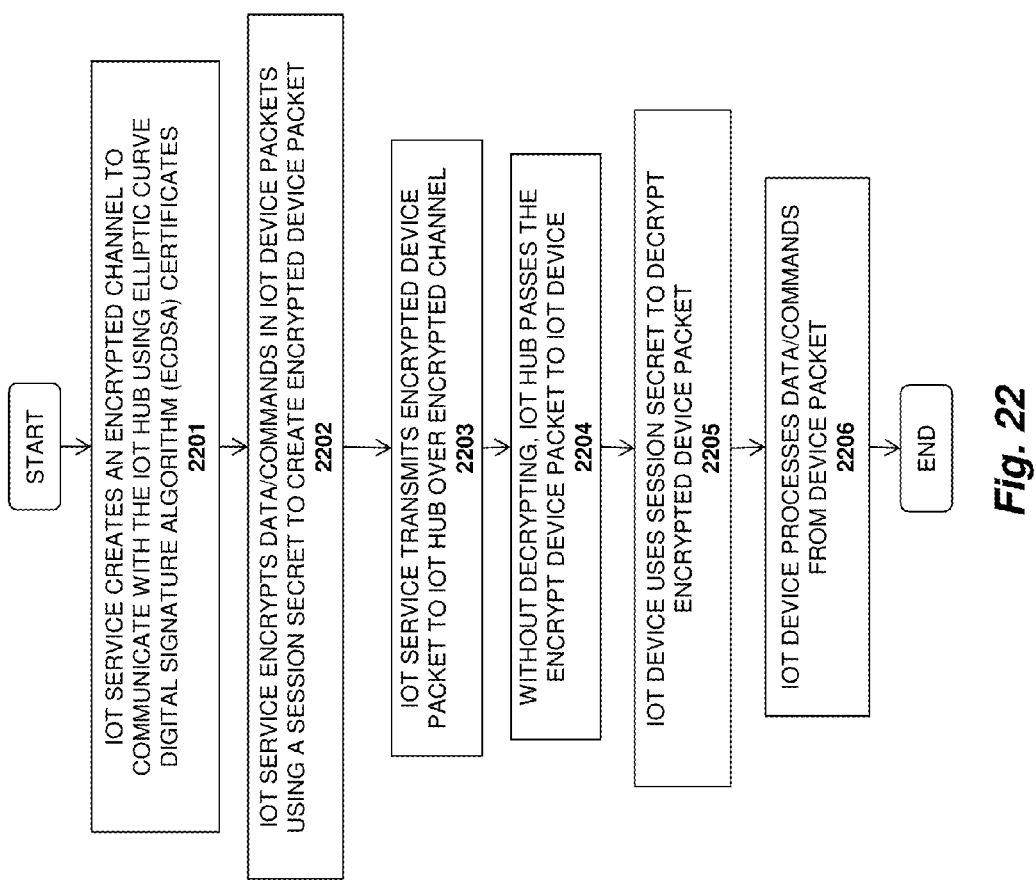
FIG. 22 illustrates a method in accordance with one embodiment of the invention.

FIG. 22 illustrates a method for implementing a secure communication channel between an IoT service and an IoT device in accordance with one embodiment of the invention. The method may be implemented within the context of the network architectures described above but is not limited to any specific architecture.

At 2201, the IoT service creates an encrypted channel to communicate with the IoT hub using elliptic curve digital signature algorithm (ECDSA) certificates. At 2202, the IoT service encrypts data/commands in IoT device packets using the a session secret to create an encrypted device packet. As mentioned above, the session secret may be independently generated by the IoT device and the IoT service. At 2203, the IoT service transmits the encrypted device packet to the IoT hub over the encrypted channel. At 2204, without decrypting, the IoT hub passes the encrypted device packet to the IoT device. At 22-5, the IoT device uses the session secret to decrypt the encrypted device packet. As mentioned, in one embodiment this may be accomplished by using the secret and a counter value (provided with the encrypted device packet) to generate a key stream and then using the key stream to decrypt the packet. At 2206, the IoT device then extracts and processes the data and/or commands contained within the device packet.

Thus, using the above techniques, bi-directional, secure network socket abstractions may be established between two BT-enabled devices without formally pairing the BT devices using standard pairing techniques. While these techniques are described above with respect to an IoT device 101 communicating with an IoT service 120, the underlying principles of the invention may be implemented to negotiate and establish a secure communication channel between any two BT-enabled devices.

Figure 23A:
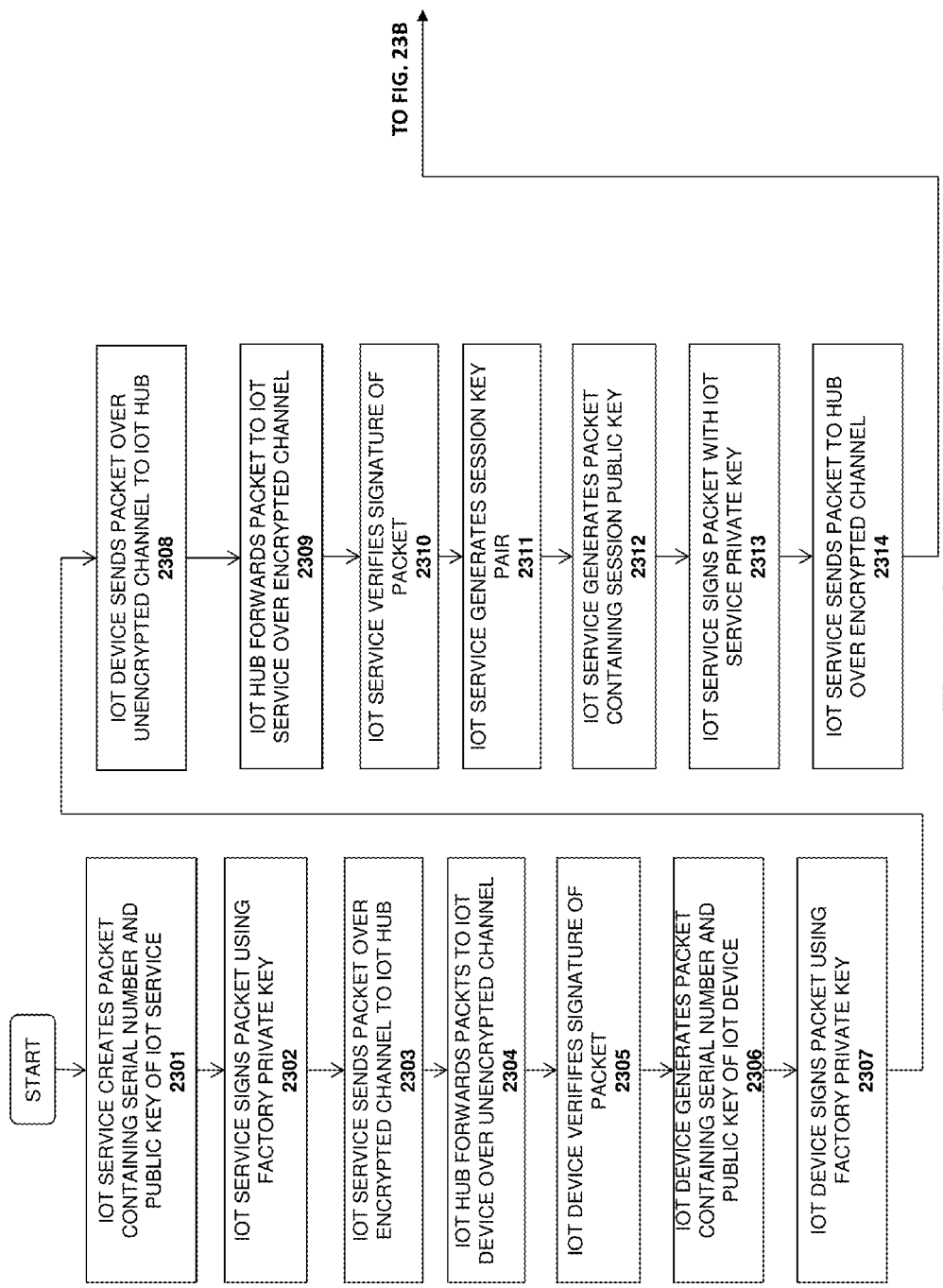
FIGS. 23A-C illustrate a method for secure pairing in accordance with one embodiment of the invention.
Figure 23B:
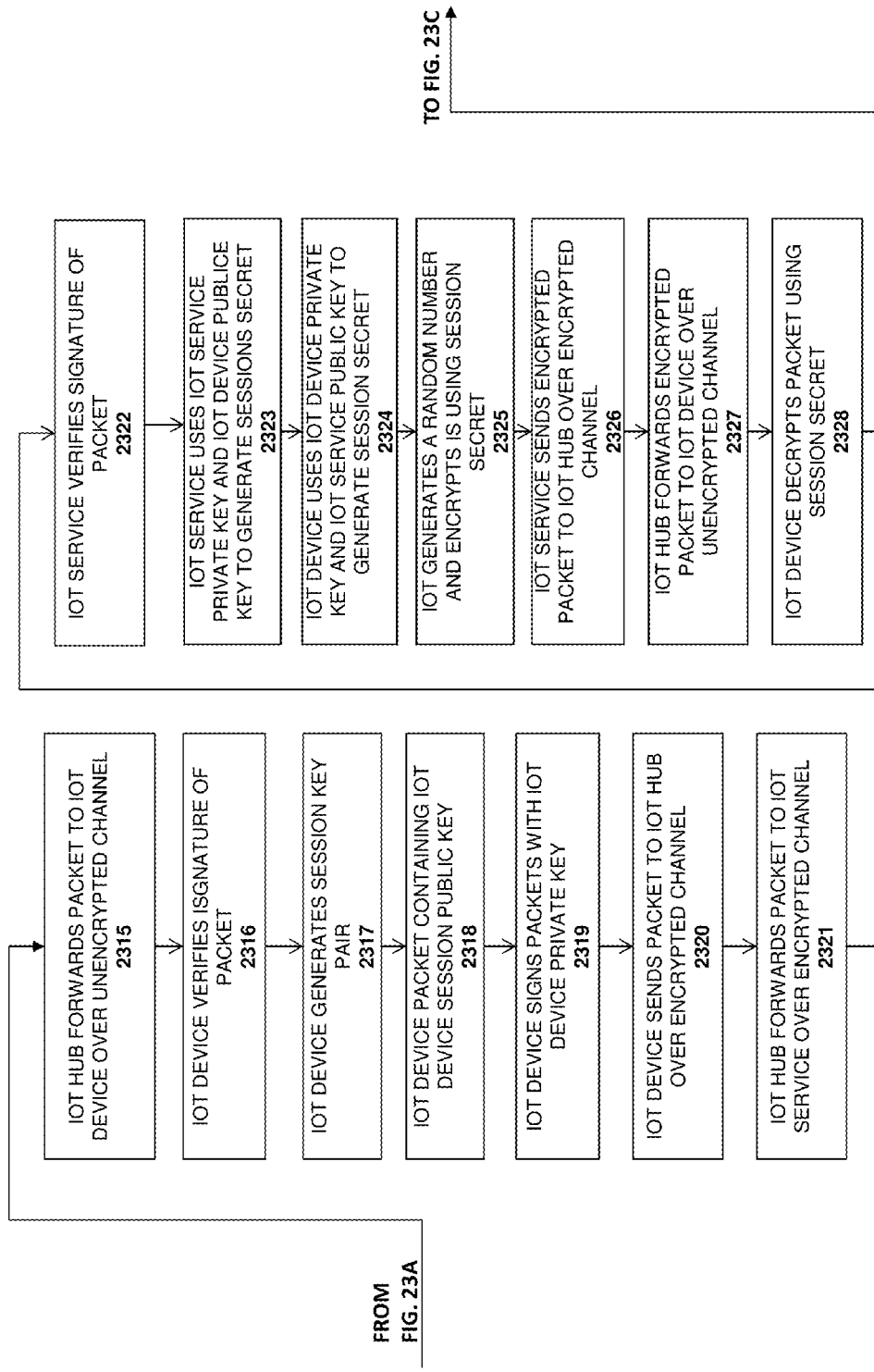
Figure 23C:
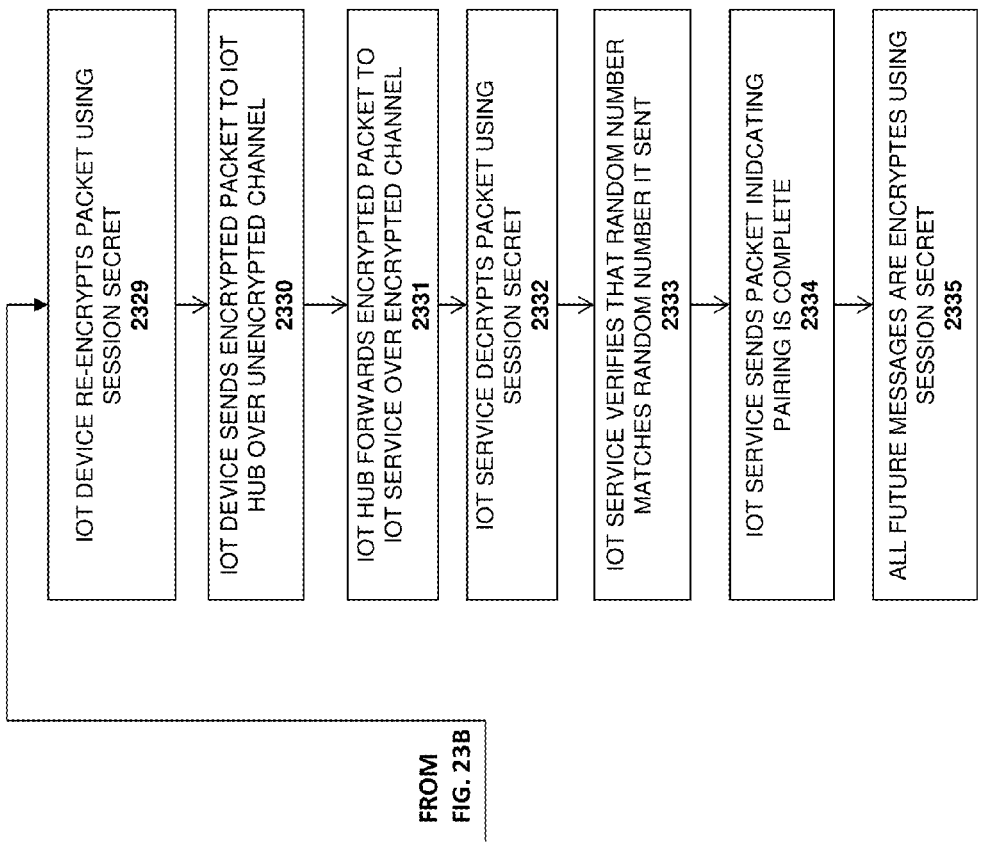

FIGS. 23A-C illustrate a detailed method for pairing devices in accordance with one embodiment of the invention. The method may be implemented within the context of the system architectures described above, but is not limited to any specific system architectures.

At 2301, the IoT Service creates a packet containing serial number and public key of the IoT Service. At 2302, the IoT Service signs the packet using the factory private key. At 2303, the IoT Service sends the packet over an encrypted channel to the IoT hub and at 2304 the IoT hub forwards the packet to IoT device over an unencrypted channel. At 2305, the IoT device verifies the signature of packet and, at 2306, the IoT device generates a packet containing the serial number and public key of the IoT Device. At 2307, the IoT device signs the packet using the factory private key and at 2308, the IoT device sends the packet over the unencrypted channel to the IoT hub.

At 2309, the IoT hub forwards the packet to the IoT service over an encrypted channel and at 2310, the IoT Service verifies the signature of the packet. At 2311, the IoT Service generates a session key pair, and at 2312 the IoT Service generates a packet containing the session public key. The IoT Service then signs the packet with IoT Service private key at 2313 and, at 2314, the IoT Service sends the packet to the IoT hub over the encrypted channel.

Turning to FIG. 23B, the IoT hub forwards the packet to the IoT device over the unencrypted channel at 2315 and, at 2316, the IoT device verifies the signature of packet. At 2317 the IoT device generates session key pair (e.g., using the techniques described above), and, at 2318, an IoT device packet is generated containing the IoT device session public key. At 2319, the IoT device signs the IoT device packet with IoT device private key. At 2320, the IoT device sends the packet to the IoT hub over the unencrypted channel and, at 2321, the IoT hub forwards the packet to the IoT service over an encrypted channel.

At 2322, the IoT service verifies the signature of the packet (e.g., using the IoT device public key) and, at 2323, the IoT service uses the IoT service private key and the IoT device public key to generate the session secret (as described in detail above). At 2324, the IoT device uses the IoT device private key and IoT service public key to generate the session secret (again, as described above) and, at 2325, the IoT device generates a random number and encrypts it using the session secret. At 2326, the IoT service sends the encrypted packet to IoT hub over the encrypted channel. At 2327, the IoT hub forwards the encrypted packet to the IoT device over the unencrypted channel. At 2328, the IoT device decrypts the packet using the session secret.

Turning to FIG. 23C, the IoT device re-encrypts the packet using the session secret at 2329 and, at 2330, the IoT device sends the encrypted packet to the IoT hub over the unencrypted channel. At 2331, the IoT hub forwards the encrypted packet to the IoT service over the encrypted channel. The IoT service decrypts the packet using the session secret at 2332. At 2333 the IoT service verifies that the random number matches the random number it sent. The IoT service then sends a packet indicating that pairing is complete at 2334 and all subsequent messages are encrypted using the session secret at 2335.

Apparatus and Method for Modifying Packet Interval Timing to Identify a Data Transfer Condition Bluetooth Low Energy (BTLE) devices send advertising packets separated by an "advertising interval" to establish connections between devices. A BTLE peripheral device broadcasts advertising packets to every device around it using the advertising interval. A receiving BTLE device can then act on this information or connect to receive more information.

The 2.4 GHz spectrum for BTLE extends from 2402 MHz to 2480 MHz and uses 40 1 MHz wide channels, numbered 0 to 39. Each channel is separated by 2 MHz. Channels 37, 38, and 39 are used only for sending advertisement packets. The rest are used for data exchange during a connection. During a BTLE advertisement, a BTLE peripheral device transmits packets on the 3 advertising channels one after the other. A central device scanning for devices or beacons will listen to those channels for the advertising packets, which helps it discover devices nearby. Channels 37, 38 and 39 are intentionally spread across the 2.4 GHz spectrum (i.e., channels 37 and 39 are the first and last channels in the band and channel 38 is in the middle). If any single advertising channel is blocked, the other channels are likely to be free since they are separated by several MHz of bandwidth.

When an IoT device has data to be transmitted, it would normally include a flag as part of its advertisement packets to indicate that data is ready to be sent. In one embodiment of the invention, rather than using this flag, an IoT device adjusts the advertising interval to indicate that it has pending data. For example, if T is the time between advertisement packets when no data is pending, a different advertising interval such as 0.75 T, 0.5 T, or 1.25 T may be selected to indicate that data is pending. In one embodiment, the two different intervals are programmable based on the specific requirements of the application and to make it harder to determine which interval means which state.

Figure 24:
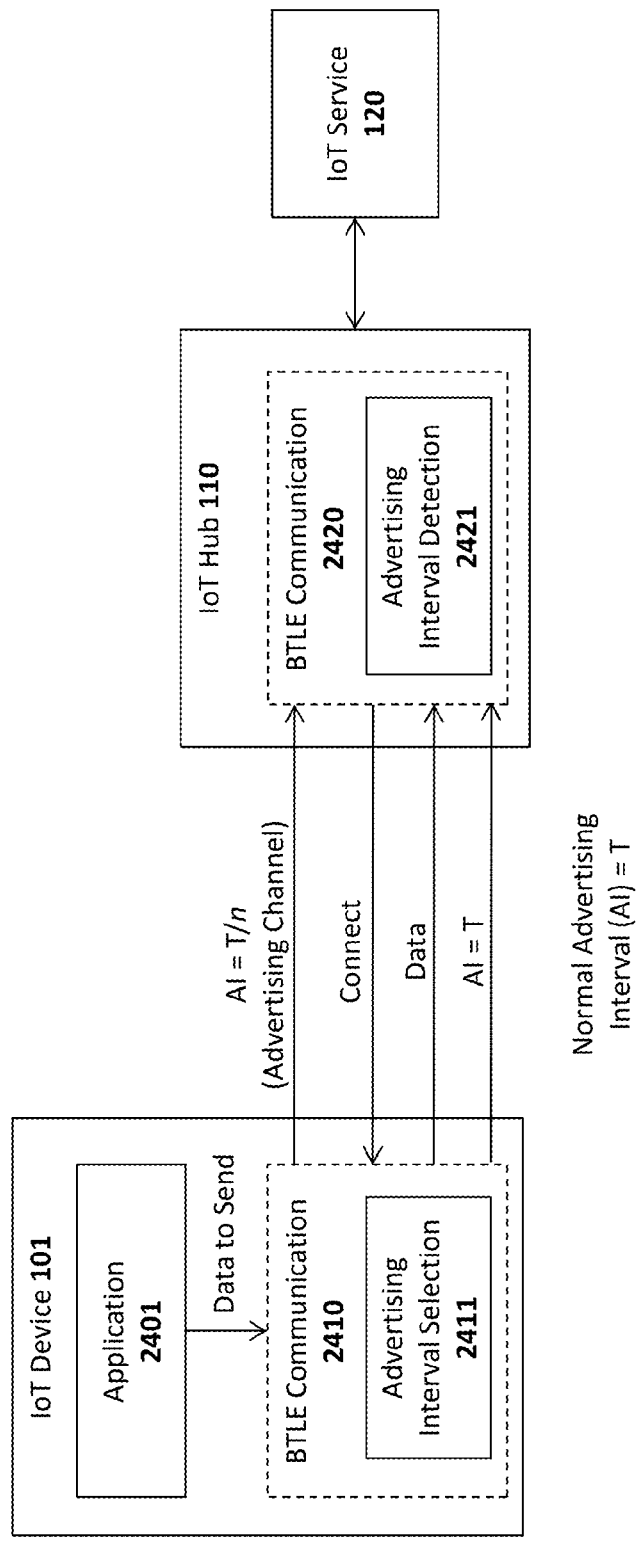
FIG. 24 illustrates one embodiment of the invention for adjusting an advertising interval to identify a data transmission condition.

FIG. 24 illustrates one embodiment of an IoT device 101 in which the BTLE communication interface 2410 includes advertising interval selection logic 2411 which adjusts the advertising interval when data is ready to be transmitted. In addition, the BTLE communication interface 2420 on the IoT hub 110 includes advertising interval detection logic 2421 to detect the change in the advertising interval, provide an acknowledgement, and receive the data.

In particular, in the illustrated embodiment, an application 2401 on the IoT device 101 indicates that it has data to be sent. In response, the advertising interval selection logic 2411 modifies the advertising interval to notify the IoT hub 110 that data is to be transmitted (e.g., changing the interval to 0.75 T or some other value). When the advertising interval detection logic 2421 detects the change, the BTLE communication interface 2420 connects to the BTLE communication interface 2410 of the IoT device 101, indicating that it is ready to receive the data. The BTLE communication interface 2410 of the IoT device 101 then transmits the data to the BTLE communication interface 2420 of the IoT hub. The IoT hub may then pass the data through to the IoT service 120 and/or to the user's client device (not shown). After the data has been transmitted, the advertising interval selection logic 2411 may then revert back to the normal advertising interval (e.g., AI=T).

In one embodiment of the invention, a secure communication channel is established between the IoT device 101 and the IoT service 120 using one or more of the security/encryption techniques described above (see, e.g., FIGS. 16A-23C and associated text). For example, in one embodiment, the IoT service 120 performs a key exchange with the IoT device 101 as described above to encrypt all communication between the IoT device 101 and the IoT service 120.

Figure 25:
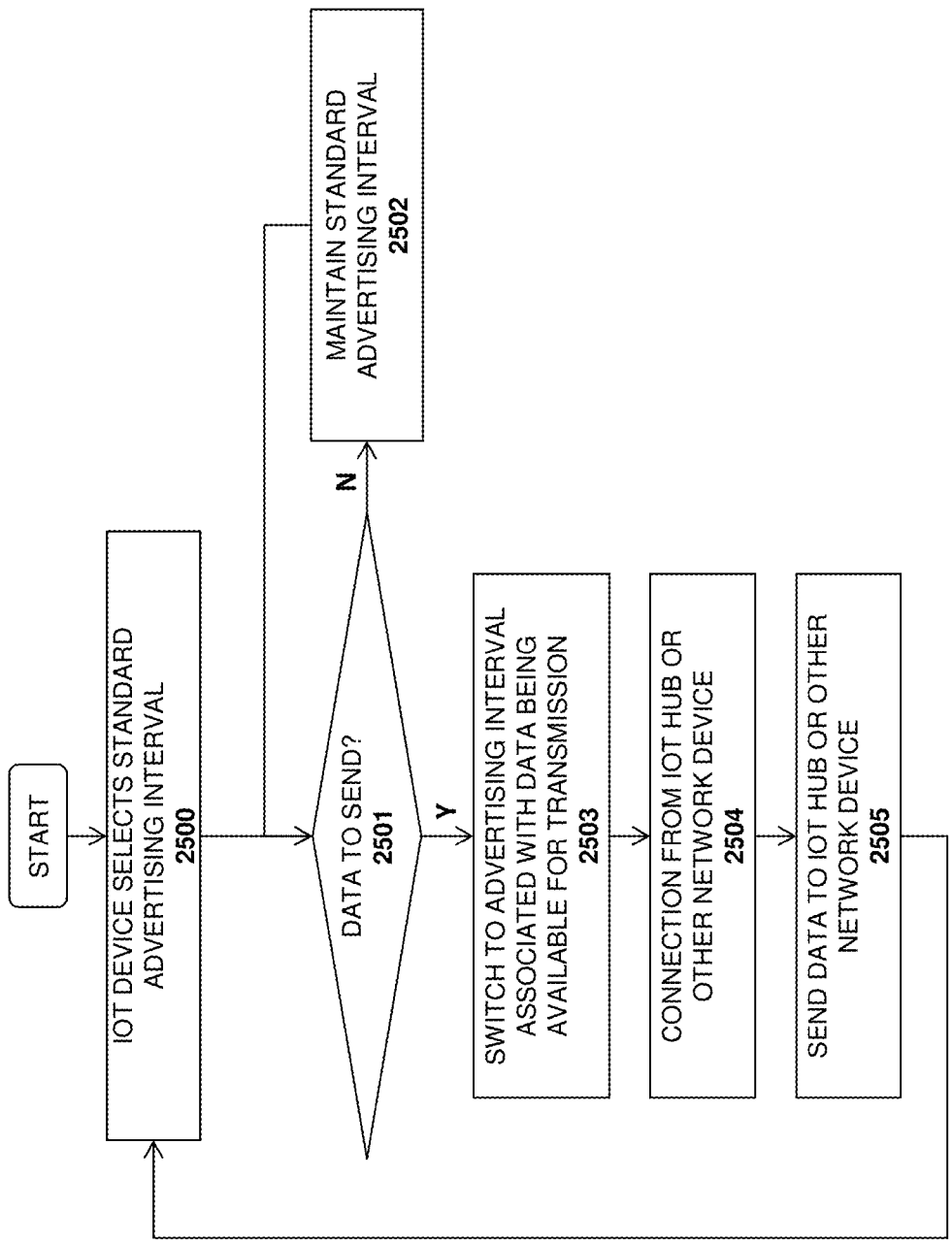
FIG. 25 illustrates a method in accordance with one embodiment of the invention.

A method in accordance with one embodiment of the invention is illustrated in FIG. 25. The method may be implemented within the context of the system architectures described above, but is not limited to any particular system architectures.

At 2500, the IoT device uses the standard advertising interval when generating advertising packets (e.g., separated by time T). The IoT device maintains the standard advertising interval at 2502 until it has data to send, determined at 2501. Then, at 2503, the IoT device switches the advertising interval to indicate that it has data to transmit. At 2504, the IoT hub or other network device establishes a connection with the IoT device, thereby allowing the IoT device to transmit its data. Finally, at 2505, the IoT device transmits its pending data to the IoT hub.

It should be noted that while the advertising interval techniques are described herein within the context of the BTLE protocol, the underlying principles of the invention are not limited to BTLE. In fact, the underlying principles of the invention may be implemented on any system which selects an advertising interval for establishing wireless communication between devices.

In addition, while a dedicated IoT hub 110 is illustrated in many embodiments above, a dedicated IoT hub hardware platform is not required for complying with the underlying principles of the invention. For example, the various IoT hubs described above may be implemented as software executed within various other networking devices such as iPhones® and Android® devices. In fact, the IoT hubs discussed above may be implemented on any device capable of communicating with IoT devices (e.g., using BTLE or other local wireless protocol) and establishing a connection over the Internet (e.g., to an IoT service using a WiFi or cellular data connection).

Apparatus and Method for Modifying Packet Interval Timing Based on IoT Device Characteristics As mentioned, BTLE devices send advertising packets separated by an "advertising interval" to establish connections between devices. A BTLE-enabled IoT device broadcasts advertising packets to every device around it using the advertising interval. A receiving BTLE device (e.g., such as an IoT hub 110 or user device) can then act on this information or connect to receive more information.

One embodiment of the invention adjusts the advertising interval of an IoT device based on IoT device characteristics such as the historical usage characteristics of the device, the type of IoT device, and/or the power source to which the IoT device is connected. Making the advertising rate slower increases battery life but adds additional latency to the system (e.g., since the IoT hub needs to wait to 'hear' an advertisement from the IoT device before it can connect). Conversely, speeding up the advertising rate decreases battery life, but lowers the latency. Consequently, by analyzing several factors, including, for example, historical device usage patterns, the type of device (e.g a security system needs to have lower latency, a coffee maker can have higher latency), and/or the power source (wall-powered devices don't need to be optimized for power usage), one embodiment of the invention automatically determines and sets an advertising rate that best meets the requirements and usage patterns of each IoT device. Moreover, this advertising rate is not permanent, and may change over time as additional data is collected and algorithms are improved.

Figure 26:
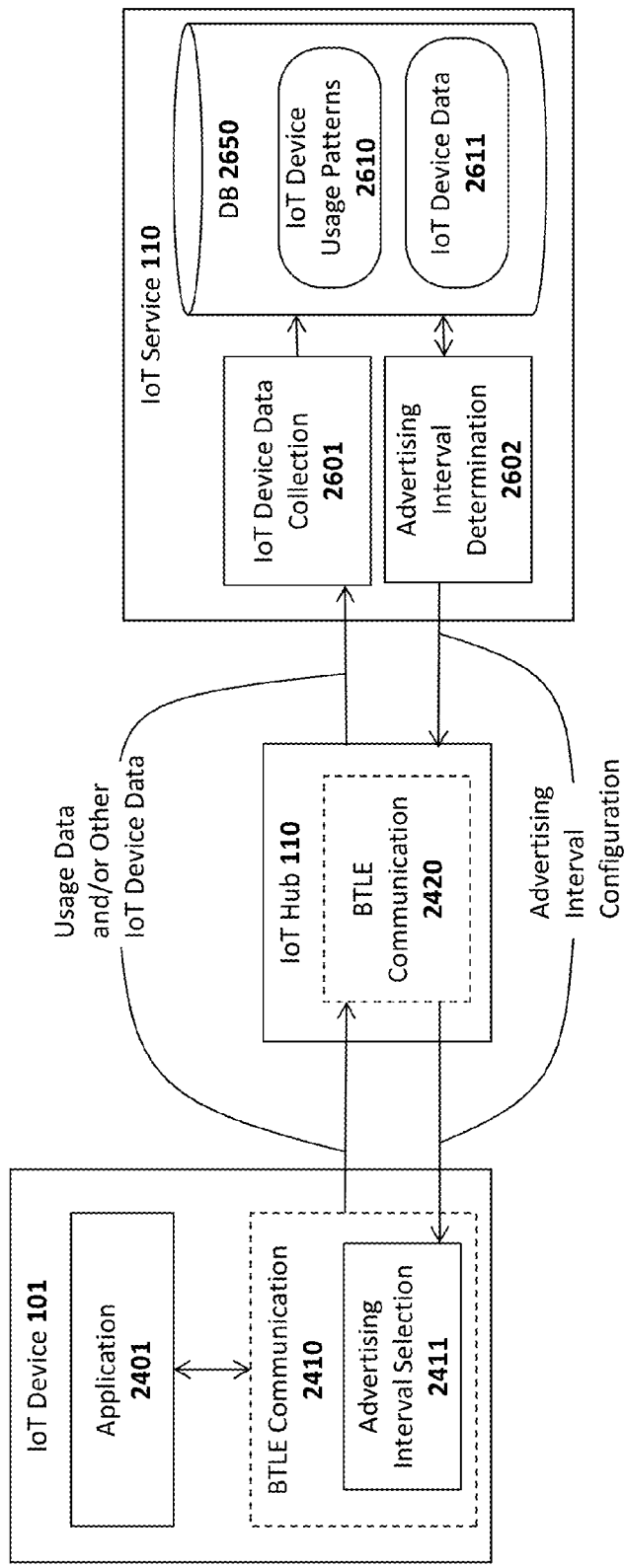
FIG. 26 illustrates one embodiment for modifying packet interval timing based on device characteristics and/or usage data.

One such embodiment is illustrated in FIG. 26, which shows a BTLE communication module 2410 of an IoT device 101 with advertising interval selection module 2411 for dynamically adjusting the advertising interval using the techniques described herein. As illustrated, IoT device usage data and/or other pertinent IoT device data (e.g., such as whether the IoT device 101 is connected to an A/C power source or battery powered) is transmitted to an IoT device data collection logic 2601 running on the IoT service 110. In one embodiment, the IoT device data collection module 2601 stores the usage data 2610 and/or other IoT device data 2611 within a database 2650 on the IoT service 110. An advertising interval determination module 2602 uses the collected IoT device usage patterns 2610 and IoT device data 2611 to determine an appropriate advertising interval for the IoT device. Once the advertising interval is determined, it is communicated back to the advertising interval selection module 2411 of the IoT device, which implements the new advertising interval.

As mentioned, the advertising interval determination module 2602 may determine an appropriate advertising rate based on variables such as historical device usage patterns. For example, IoT devices which transmit/receive data frequently may be assigned relatively shorter advertising intervals than IoT devices which transmit/receive data at a relatively low rate. In addition, the advertising interval determination module 2602 may determine the advertising interval based (at least in part) on the type of IoT device in question. For example, an IoT device 101 of a security system needs to have lower latency whereas an IoT device integrated in a coffee maker may have a higher latency. Furthermore, the advertising interval determination module 2602 may factor in the power source that the IoT device is using. For example, AC-powered devices do not need to be optimized for power usage, and can therefore utilize a shorter advertising interval, whereas battery-powered IoT devices would benefit from a relatively longer advertising interval (e.g., to reduce power consumption). In one embodiment, the advertising interval determination module 2602 factors in all or a subset of these variables when selecting an appropriate advertising interval for the IoT device 101. For new IoT devices, where device-specific information is not available, the advertising interval determination module 2602 may set the initial advertising interval based on historical data collected from other instances of the same or similar types of IoT devices collected by the IoT device data collection module 2601 and stored in the database 2650.

Figure 27:
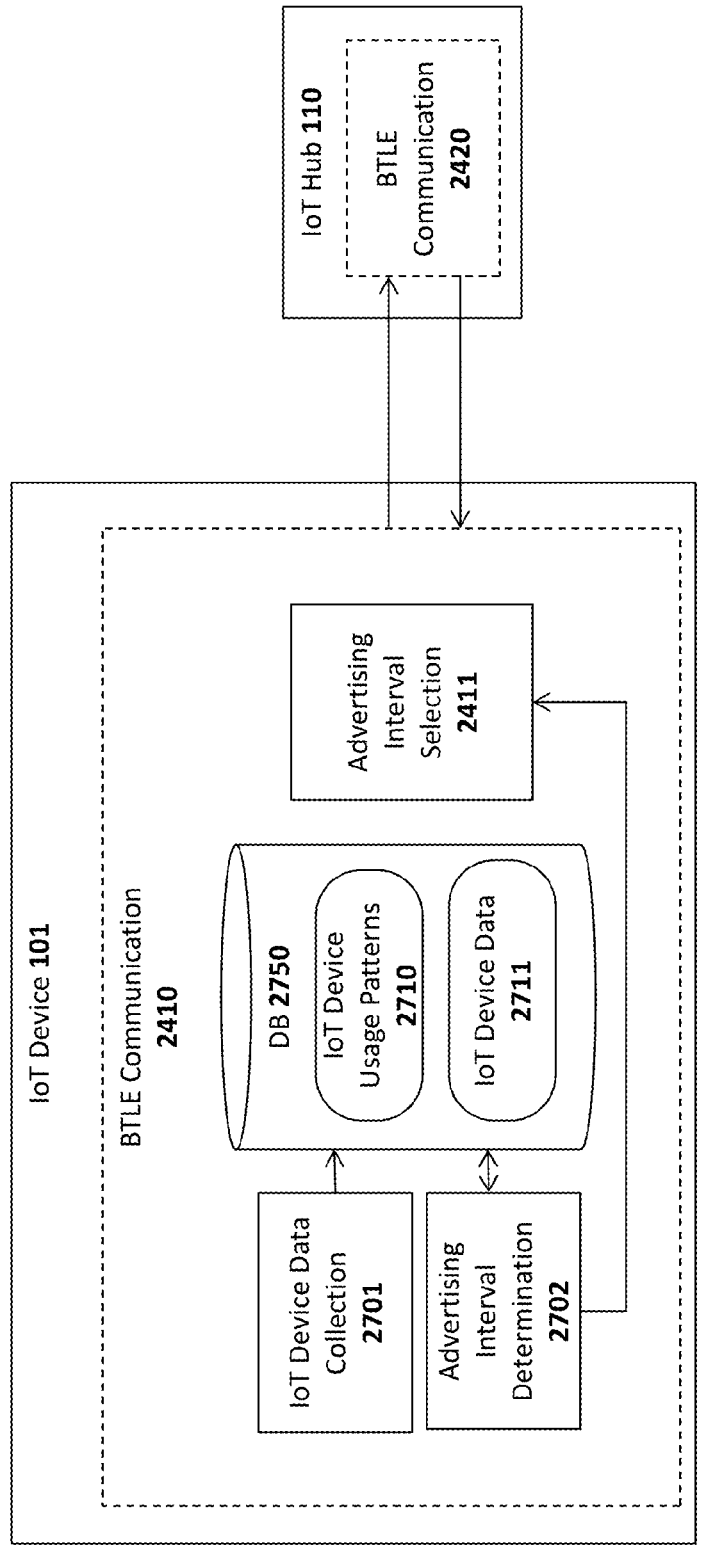
FIG. 27 illustrates another embodiment for modifying packet interval timing based on device characteristics and/or usage data.

While the embodiment shown in FIG. 26 determines an appropriate advertising interval on the IoT service, the advertising interval may be determined locally, for example, within the IoT hub 110 and/or within the IoT device 101 itself. FIG. 27 illustrates one particular embodiment in which the determination of an advertising interval is performed within the BTLE communication module 2410. In particular, an IoT device data collection module 2701 collects pertinent data related to the advertising interval (e.g., frequency of data communication, whether the IoT device is powered from AC, etc) and stores the usage data 2710 and other data 2711 within a local database 2750. Advertising interval determination module 2702 then determines an appropriate advertising interval using one or more of the techniques/variables previously discussed. Once a particular advertising interval has been determined, it is implemented by the advertising interval selection module 2411 as described above. In one implementation, the advertising interval determination module 2702 selects an advertising interval solely based on how frequently the IoT device needs to transmit/receive data.

Figure 28:
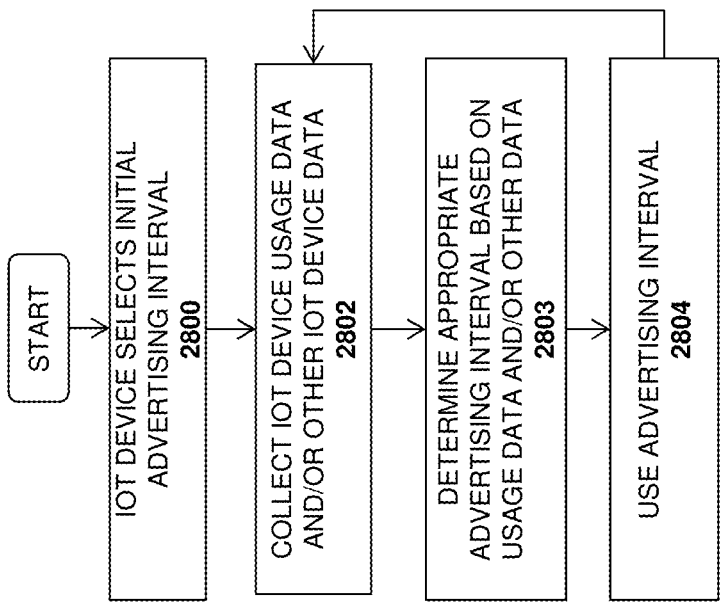
FIG. 28 illustrates a method in accordance with one embodiment of the invention.

A method in accordance with one embodiment of the invention is illustrated in FIG. 28. The method may be implemented within the context of the architectures described above but is not limited to any particular system architecture.

At 2800 the IoT device selects the initial advertising interval. This may be a "default" advertising interval initially programmed into the IoT device (e.g., based on the IoT device type). At 2802 IoT device usage data and/or other IoT device data (e.g., power source, etc) is collected and, at 2803, an appropriate advertising interval is determine based on the usage data. Finally, at 2804, the advertising interval is implemented to connect to one or more BTLE-enabled devices (e.g., such as the IoT hub described herein).

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
   Internet of Things (IoT) device data collection circuitry/logic to collect IoT device usage data and other IoT device data;
   advertising interval determination circuitry/logic to determine an appropriate advertising interval based on the IoT device usage data and other IoT device data, wherein the IoT device usage data comprises a frequency with which the IoT device transmits/receives data, and wherein the other IoT device data comprises the IoT device type; and
   advertising interval selection circuitry/logic to implement the appropriate advertising interval determined by the advertising interval determination circuitry/logic.

2. The apparatus as in claim 1 wherein the other IoT device data comprises an indication as to whether the IoT device is powered by a battery or by a wired power source.

3. The apparatus as in claim 2 wherein a relatively longer advertising interval is selected for IoT devices powered by a battery than comparable IoT devices powered by a wired power source.

4. The apparatus as in claim 1 wherein the IoT device data collection circuitry/logic and advertising interval determination circuitry/logic is implemented within an IoT service.

5. The apparatus as in claim 4 wherein the advertising interval selection circuitry/logic is implemented within the IoT device.

6. The apparatus as in claim 1 wherein the IoT device data collection circuitry/logic is to continually or periodically collect IoT device usage data and wherein the advertising interval determination circuitry/logic is to continually or periodically determine a new advertising interval based on the IoT device usage data and/or other IoT device data.

7. The apparatus as in claim 1 wherein the IoT device data collection circuitry/logic and advertising interval determination circuitry/logic is implemented within the IoT device.

8. A system comprising:
   an IoT device comprising local wireless communication circuitry/logic including advertising interval selection circuitry/logic to implement a specified advertising interval;
   an IoT service comprising:
      IoT device data collection circuitry/logic to collect IoT device usage data and other IoT device data, wherein the IoT device usage data comprises a frequency with which the IoT device transmits/receives data, and wherein the other IoT device data comprises the IoT device type; and advertising interval determination circuitry/logic to determine an appropriate advertising interval based on the IoT device usage data and other IoT device data and to transmit the appropriate advertising interval to the advertising interval selection circuitry/logic;

the advertising interval selection circuitry/logic to implement the appropriate advertising interval determined by the advertising interval determination circuitry/logic.

9. The system as in claim 8 wherein the other IoT device data comprises an indication as to whether the IoT device is powered by a battery or by a wired power source.

10. The system as in claim 9 wherein a relatively longer advertising interval is selected for IoT devices powered by a battery than comparable IoT devices powered by a wired power source.

11. The system as in claim 8 further comprising:
an IoT hub comprising local wireless communication circuitry/logic to establish a local wireless connection with the local wireless communication circuitry/logic of the IoT device.

12. The system as in claim 11 wherein the IoT hub further comprises a remote network connection interface to establish a remote network connection with the IoT service, thereby communicatively coupling the IoT device to the IoT service.

13. The system as in claim 8 wherein the IoT device data collection circuitry/logic is to continually or periodically collect IoT device usage data and wherein the advertising interval determination circuitry/logic is to continually or periodically determine a new appropriate advertising interval based on the IoT device usage data and/or other IoT device data.

14. A method comprising:
collecting IoT device usage data and other IoT device data from an IoT device, wherein the IoT device usage data comprises a frequency with which the IoT device transmits/receives data, and wherein the other IoT device data comprises the IoT device type;

determining an appropriate advertising interval based on the IoT device usage data and other IoT device data; and implementing the appropriate advertising interval determined by the advertising interval determination circuitry/logic.

15. The method as in claim 14 wherein the other IoT device data comprises an indication as to whether the IoT device is powered by a battery or by a wired power source.

16. The method as in claim 15 wherein a relatively longer advertising interval is selected for IoT devices powered by a battery than comparable IoT devices powered by a wired power source.

17. The method as in claim 14 wherein the operations of collecting device usage data and determining an appropriate advertising interval are performed by an IoT service.

18. The method as in claim 17 wherein the advertising interval selection circuitry/logic is implemented within the IoT device.

19. The method as in claim 14 wherein the IoT device usage data is continually or periodically collected and wherein a new advertising interval is selected based on the IoT device usage data and/or other IoT device data.

* * * * *